(12) United States Patent
Massarella et al.

(10) Patent No.: US 10,571,544 B2
(45) Date of Patent: Feb. 25, 2020

(54) DIRECTION FINDING USING SIGNAL POWER

(71) Applicant: CRFS LIMITED, Cambridge, Cambridgeshire (GB)

(72) Inventors: Alistair Massarella, Cambridge (GB); Daniel Timson, Cambridge (GB); Keith Alexander, Cambridge (GB)

(73) Assignee: CRFS Limited, Cambridge (GB)

( * ) Notice: Subject to any disclaimer, the term of this patent is extended or adjusted under 35 U.S.C. 154(b) by 211 days.

(21) Appl. No.: 15/548,332

(22) PCT Filed: Feb. 1, 2016

(86) PCT No.: PCT/GB2016/050216
§ 371 (c)(1),
(2) Date: Aug. 2, 2017

(87) PCT Pub. No.: WO2016/124898
PCT Pub. Date: Aug. 11, 2016

(65) Prior Publication Data
US 2018/0024220 A1 Jan. 25, 2018

(30) Foreign Application Priority Data
Feb. 2, 2015 (GB) .................................. 1501813.8

(51) Int. Cl.
*G01S 3/02* (2006.01)
*G01S 3/74* (2006.01)
(Continued)

(52) U.S. Cl.
CPC .............. *G01S 3/74* (2013.01); *G01S 3/043* (2013.01); *G01S 3/26* (2013.01); *G01S 3/48* (2013.01); *G01S 3/54* (2013.01)

(58) Field of Classification Search
CPC ... G01S 3/043; G01S 3/26; G01S 3/48; G01S 3/50; G01S 3/54; G01S 3/74
(Continued)

(56) References Cited

U.S. PATENT DOCUMENTS 7,477,192 B1 1/2009 Haff et al.
2002/0190902 A1 12/2002 Samson et al.

OTHER PUBLICATIONS

International Search Report and Written Opinion for Application No. PCT/US2016/050216, dated May 13, 2016. 11 pages.
(Continued)

*Primary Examiner* — Dao L Phan
(74) *Attorney, Agent, or Firm* — McCarter & English, LLP; David R. Burns

(57) ABSTRACT

A method of determining incident angles of Radio Frequency, RF, signals received by an antenna array comprising a plurality of antennae is described. The method comprises generating a plurality of direction finding, DF, signals based on antenna signals received from the antenna array, wherein each DF signal corresponds to a respective antenna array element and each antenna array element corresponds to one or more antennae. A plurality of DF spectra are then generated, each DF spectrum corresponding to a respective DF signal and comprising measured values of signal power at two or more given respective frequencies. An incident signal angle is calculated for each given frequency, based on the measured values of power at the frequency, the configuration of the antennae in the antenna array and antenna gain patterns corresponding to the antenna array elements.

20 Claims, 18 Drawing Sheets

(51) Int. Cl.
  *G01S 3/04* (2006.01)
  *G01S 3/26* (2006.01)
  *G01S 3/48* (2006.01)
  *G01S 3/54* (2006.01)

(58) Field of Classification Search
  USPC .......................................................... 342/417
  See application file for complete search history.

(56) References Cited

OTHER PUBLICATIONS

United Kingdom Combined Search and Examination Report under Sections 17 and 18(3) for Application No. GB1501813.8, dated Jul. 7, 2015. 6 pages.
International Preliminary Report on Patentability for Application No. PCT/US2016/050216, dated Aug. 17, 2017. 8 pages.

DIRECTION FINDING USING SIGNAL POWER

RELATED APPLICATIONS

This application is a 35 U.S.C. § 371 national stage filing of International Application No. PCT/GB2016/050216, filed Feb. 1, 2016, which claims priority to United Kingdom Patent Application No. 1501813.8, filed Feb. 2, 2015. The entire contents of each of the foregoing applications are incorporated herein by reference.

FIELD OF THE INVENTION

The present invention relates to direction finding, particularly using measured power of a signal to determine an incident angle of a signal.

BACKGROUND

Systems which can determine the incident angle of a signal, also referred to as Angle Of Arrival, AOA, or Direction Finding (DF) systems, can be used in a variety of applications such as navigation, search and rescue, spectrum monitoring and security. When several DF systems in different locations receive the same signal, the estimated incident angles measured by each DF system can be used to estimate a location for the signal source by triangulation. Alternatively, if the signal strength is known or can be estimated, then the signal source location can be estimated using an incident angle from a single DF system and the signal amplitude. Direction finding methods can be used with a variety of signal types, for example Radio Frequency (RF) signals or acoustic signals.

Existing DF systems may employ a single receiver such as, for example, a rotating or steerable directional receiver, i.e. a receiver which detects signals with a gain dependent on the incident angle of the signal. By taking measurements with the directional receiver pointing in different directions, the direction of signal source can be estimated. For example, "Single Antenna Power Measurements Based Direction Finding" J. Lie et. al. IEEE Transactions on signal processing, Vol. 58, No. 11, November 2010, page 5682, describes a single-antenna power measurement based DF system which uses multiple power measurements captured with the single antenna pointing in different directions. However, since a single receiver DF system must be rotated, detection and direction finding of short lived or fast moving signals can be difficult.

DF systems may employ arrays of receivers. DF receiver arrays may include directional receivers, non-directional receivers or a combination of directional and non-directional receivers. DF receiver arrays can be phased receiver arrays and employ beam-forming methods. For example U.S. Pat. No. 6,411,257 B1 describes estimating the angle at which a multipath finger produced by a digital radio communications source arrives at an antenna array by using an uplink weight vector associated with the multipath finger. W. Read, 'An Evaluation of the Watson-Watt and Butler Matrix Approaches For Direction Finding' DREO TR 1999-092, describes angle of arrival estimation by vector addition of voltage amplitudes with antenna patterns at right angles. S Lipsky, Microwave Passive Direction Finding, Scitech Publishing 2004, describes a gradient estimation technique for determining the angle of arrival for signals at a single frequency, received by Gaussian antennae. R Poisel, Electronic Warfare Target Location Methods, Artech House 2012, describes angle of arrival determination for signals received at a single frequency using a least squares method.

Existing methods employed in DF systems may use a variety of measurement types such as, for example, signal phase, amplitude, power, pseudo-Doppler, or correlation. The suitability of these measurements may vary depending on signal characteristics such as frequency, bandwidth and signal waveform, and direction finding may be restricted to voltage amplitudes and/or to a single frequency channel, such that multiple signal sources transmitting in different frequency bands cannot be located simultaneously/in the same set of measurements, so that detection and direction finding of short lived or fast moving signal sources can be difficult.

SUMMARY

According to a first aspect of the invention there is provided a method of determining incident angles of radio frequency (RF) signals received by an antenna array comprising a plurality of antennae. The method comprises generating a plurality of direction finding (DF) signals based on antenna signals received from the antenna array, wherein each DF signal corresponds to a respective antenna array element corresponding to one or more antennae. The method comprises generating a plurality of DF spectra, each DF spectrum corresponding to a respective DF signal and comprising measured values of signal power at two or more given respective frequencies. The method comprises determining an incident signal angle for each given frequency based on the measured values of power at the frequency, the configuration of the antennae in the antenna array and antenna gain patterns corresponding to the antenna array elements.

Using power values can enable wideband power spectrum measurement techniques to be used to obtain power measurements for frequencies spanning a wide bandwidth in a single set of measurements. Using the measured power values for direction finding can allow the incident angles of signals at different frequencies from multiple signal sources to be determined from a single set of measurements. This can help with tracking multiple signal sources which are moving rapidly and/or transmitting signals with short durations.

Incident signal angles may be calculated for more than two given frequencies, more than ten given frequencies, more than a hundred given frequencies or more than a thousand given frequencies using a single set of DF spectrum measurements.

The calculated incident signal angles may be corrected using respective correction factors stored in a calibration look-up table and pre-determined during calibration of the antenna array.

Each antenna array element may have a directionally dependent antenna gain pattern, such that each DF signal has a corresponding direction vector determined based on the respective antenna gain pattern. Determining an incident signal angle for each given frequency may comprise selecting a set of at least two DF spectra from the plurality of DF spectra, calculating a resultant vector as a weighted sum of the direction vectors corresponding to each of the set of at least two selected DF spectra, wherein the direction vectors are weighted by a monotonically increasing function of the respective measured values of signal power at the given frequency, and determining the incident signal angle for the frequency based on the resultant vector. The set of DF spectra may be the plurality of DF spectra. Selecting a set of DF spectra for each frequency may be based on the measured power values at the frequency. The resultant vector may be calculated as $V_R(f)=\Sigma V_n \times F(P_n(f))$, in which f is the given frequency, $V_R$ is the resultant vector at the given frequency, $V_n$ is the direction vector corresponding to the $n^{th}$ DF spectrum of the at least two DF spectra, F is a monotonically increasing function and $P_n(f)$ is the measured power of the $n^{th}$ DF spectrum at the given frequency and the sum is calculated over the set of at least two DF spectra.

Thus, when the direction of peak gain of antennae in an antenna array is known, direction finding of RF signals can be performed quickly or in real-time at each given frequency included in the DF spectra bandwidth, without detailed knowledge of the respective antenna gain patterns.

Each antenna array element may have a directionally dependent antenna gain pattern, such that each DF signal has a corresponding direction vector determined based on the respective antenna gain pattern. Determining an incident signal angle for each given frequency may comprise selecting first and second DF spectra based on the two largest power values at the frequency, calculating the ratio of the first and second DF spectra power values at the frequency, and determining the incident signal angle for the frequency relative to the midpoint of the respective direction vectors of the first and second DF spectra based on the product of the ratio expressed in decibels and a direction finding slope. The direction finding slope may be frequency dependent.

Thus, direction finding of RF signals can be performed quickly or in real-time at each given frequency included in the DF spectra bandwidth, using a readily calibrated DF slope.

A direction vector corresponding to each DF signal may be determined based on a maximum of the antenna gain pattern corresponding to the respective antenna array element.

Each antenna array element may have a directionally dependent antenna gain pattern, and generating a plurality of DF signals may comprise selecting a set of DF signals such that the respective set of directionally dependent antenna gain patterns has a distinct combination of gain values for any incident signal angle, then generating the selected set of DF signals. Determining an incident signal angle for each given frequency may comprise defining a fit parameter as the sum over a set of estimators, each estimator corresponding to a respective DF spectrum and calculated by squaring the difference of the respective measured value of signal power and an estimated signal power value calculated based on an assumed incident signal angle, an assumed signal power and the respective directionally dependent antenna gain pattern, then determining the incident signal angle for the frequency based on the values of the assumed incident signal angle and the assumed signal power which minimise the value of the fit parameter. One or more additional DF signals may be generated and the corresponding one or more additional DF spectra may be included in the definition of the fit parameter. The incident signal angle may be determined using a least squares method.

Thus, direction finding of RF signals may be performed robustly at each given frequency included in the DF spectra bandwidth. Including further DF signals in addition to a set having a distinct combination of gain values for any incident signal angle can improve the robustness of incident signal angles calculated in noisy environments.

The DF signals may be successively obtained. The DF signals may be simultaneously obtained.

Each antenna array element may be a physical antenna array element comprising one or more antennae, and each DF signal may be based on a single antenna signal received from a respective physical antenna array element.

Each antenna array element may be a hybrid antenna array element corresponding to a subset of one or more physical antennae in the antenna array, such that the DF signal corresponding to the hybrid antenna array element is based on a linear combination of the antenna signals received from the respective one or more physical antennae.

The antenna array may include first, second, third, fourth and fifth antennae, and each DF signal may be based on a respective antenna array element which corresponds to a distinct linear combination of one or more antenna signals selected from a first antenna signal $\psi_1$, a second antenna signal $\psi_2$, a third antenna signal $\psi_3$, a fourth antenna signal $\psi_4$, and a fifth antenna signal $\psi_5$, wherein the first, second, third and fourth antennae are arranged in a rectangular cruciform configuration and are equidistant a given distance from the fifth antenna, and wherein the fifth antenna lies between the first and second antennae and between the third and fourth antennae.

The antenna array may include first, second, third and fourth antennae, and each DF signal may be based on a respective antenna array element which corresponds to a linear combination of one or more antenna signals selected from a first antenna signal $\psi_1$, a second antenna signal $\psi_2$, a third antenna signal $\psi_3$, a fourth antenna signal $\psi_4$, a fifth antenna signal $\psi_5$ which is calculated as the sum of the first, second, third and fourth antenna signals, wherein the first, second, third and fourth antennae are arranged in a rectangular cruciform configuration and are equidistant a given distance from a central point, and wherein the central point lies between the first and second antennae and between the third and fourth antennae.

Selecting a set of DF signals for use with an antenna array including first, second, third and fourth antennae may comprise selecting a first DF signal based on a first antenna signal combination selected from a signal combination group comprising $\psi_1-\psi_2$, $\psi_3-\psi_4$, $\psi_1+\psi_3-\psi_2-\psi_4$ and $\psi_1+\psi_4-\psi_2-\psi_3$, selecting second and third DF signals based on adding or subtracting the product $i\beta\times\psi_5$ from second and third antenna signal combinations selected from the signal combination group, wherein the second antenna signal combination is different to the first, the third is different to the second and $\beta$ is an amplitude adjustment factor, then selecting a fourth DF signal based on the fifth antenna signal $\psi_5$.

The amplitude adjustment factor may be $\beta=\alpha\times 4\pi \cdot f_c \cdot L/c$, in which $f_c$ is the central frequency of the DF spectra, L is the given distance, c is the speed of light and $0.1 \leq \alpha \leq 10$ or $0.5 \leq \alpha \leq 1.5$.

Generating a plurality of DF signals from an antenna array including first, second, third and fourth antennae may comprise generating first and second DF signals based on a first pair of antenna signal combinations $\psi_1-\psi_2$ and $\psi_3-\psi_4$, or a second pair of antenna signal combinations $\psi_1+\psi_3-\psi_2-\psi_4$ and $\psi_1+\psi_4-\psi_2-\psi_3$, and generating eight cardioid DF signals based on the antenna signal combinations $\psi_1-\psi_2\pm i\beta\times\psi_5$, $\psi_3-\psi_4\pm i\beta\times\psi_5$, $\psi_1+\psi_3-\psi_2-\psi_4\pm i\beta\times\psi_5$ and $\psi_1+\psi_4-\psi_2-\psi_3\pm i\beta\times\psi_5$, wherein $\beta$ is an amplitude adjustment factor chosen such that the antenna gain pattern corresponding to each cardioid DF signal has a corresponding null direction. Determining an incident signal angle comprises, for each given frequency, calculating up to four estimated signal angles, each estimated signal angle based on a monotonically increasing function of the ratio of the measured values of signal power of the first and second DF spectra, then determining the incident signal angle for the frequency based on the estimated signal angle which is closest to the null direction of the cardioid DF signal which has the lowest measured value of signal power for the frequency. The monotonically increasing function may be the arctangent of the square root of the ratio of the measured values of signal power of the first and second DF spectra. Third and fourth DF signals may also be generated based on the pair of antenna signal combinations not selected for the first and second DF signals, and up to four further estimated signal angles may be calculated, each further estimated signal angle based on the arctangent of the square root of the ratio of the measured values of signal power of the third and fourth DF spectra, and the incident signal angle for the frequency may be determined based on an average of the estimated signal angle and the further estimated signal angle which are closest to the null direction of the cardioid DF signal which has the lowest measured power for the frequency.

The incident signal angle for each given frequency may be determined using a neural network which receives the measured values of power at the frequency as input.

The antenna gain patterns may be frequency dependent.

According to a second aspect of the invention there is provided apparatus configured to perform a method according to the first aspect.

According to a third aspect of the invention there is provided apparatus for determining incident angles of RF signals received by an antenna array comprising a plurality of antennae, the apparatus comprising a DF signal module configured to generate a plurality of DF signals based on antenna signals received from the antenna array, wherein the DF signal module is configured such that each DF signal corresponds to a respective antenna array element and each antenna array element corresponds to one or more antennae. The apparatus also comprising a spectrum obtaining module configured to receive the plurality of DF signals and to generate a corresponding plurality of DF spectra, each DF spectrum corresponding to a respective DF signal and comprising measured values of power at two or more given respective frequencies. The apparatus also comprising an antenna array information store configured to hold information about the configuration of the antennae in the antenna array and the antenna gain patterns corresponding to the antenna array elements and an incident angle determining module configured to determine an incident signal angle for each frequency based on the measured values of power at the frequency and the configuration of the antennae in the antenna array and the antenna gain patterns corresponding to the antenna array elements.

Each antenna array element may have a directionally dependent antenna gain pattern and the antenna array information store may be configured to hold a direction vector corresponding to each DF signal and determined based on the respective antenna gain pattern. The incident signal angle determining module may be configured to, for each given frequency, select a set of at least two DF spectra from the plurality of DF spectra, calculate a resultant vector as a weighted sum of the direction vectors corresponding to each of the set of at least two selected DF spectra, wherein the direction vectors are weighted by the respective measured values of signal power at the given frequency, and to determine the incident signal angle for the frequency based on the resultant vector.

Each antenna array element may have a directionally dependent antenna gain pattern and the antenna array information store may be configured to hold a direction vector corresponding to each DF signal and determined based on the respective antenna gain pattern. The incident signal angle determining module may be configured to, for each given frequency, select first and second DF spectra based on the two largest power values at the frequency, calculate the ratio of the first and second DF spectra power values at the frequency, and determine the incident signal angle for the frequency relative to the midpoint of the respective direction vectors of the first and second DF spectra, based on the product of the ratio expressed in decibels and a direction finding slope.

The antenna array information storage may hold antenna gain patterns which are directionally dependent. The incident signal angle determining module may be configured to, for each given frequency, select a set of DF signals such that the respective set of directionally dependent antenna gain patterns has a distinct combination of gain values for any incident signal angle, then generate the selected set of DF signals. The incident signal angle determining module may be configured to, for each given frequency, define a fit parameter as the sum over a set of estimators, each estimator corresponding to a respective DF spectrum and calculated by squaring the difference of the respective measured value of signal and an estimated signal power value calculated based on an assumed incident signal angle, an assumed signal power and the respective directionally dependent antenna gain pattern, and to determine the incident signal angle for the frequency based on the values of the assumed incident signal angle and the assumed signal power which minimise the value of the fit parameter.

The DF signal obtaining module may be configured to generate the plurality of DF signals successively and the spectrum obtaining module may include a single spectrum analyser configured to successively receive the plurality of DF signals and to generate the corresponding plurality of respective DF spectra.

The DF signal obtaining module may be configured to generate the plurality of DF signals simultaneously and the spectrum obtaining module may include a plurality of spectrum analysers, each spectrum analyser configured to receive a given DF signal and to generate the corresponding DF spectrum.

Each antenna array element may be a physical antenna array element comprising one or more antennae. The DF signal obtaining module may be configured to generate each DF signal based on a single antenna signal received from a respective physical antenna array element.

Each antenna array element may be a hybrid antenna array element corresponding to a subset of one or more physical antennae in the antenna array. The DF signal obtaining module may be configured to generate the DF signal corresponding to each hybrid antenna array element based on a linear combination of the antenna signals received from the respective one or more physical antennae.

The antenna array may include first, second, third, fourth and fifth physical antennae. The DF signal obtaining module may be configured to generate each DF signal based on a linear combination of one or more antenna signals selected from a first antenna signal $\psi_1$, a second antenna signal $\psi_2$, an third antenna signal $\psi_3$, a fourth antenna signal $\psi_4$, and a fifth antenna signal $\psi_5$, and the first, second, third and fourth antennae may be arranged in a rectangular cruciform configuration and are equidistant a given distance from the fifth antenna, and wherein the fifth antenna lies between the first and second antennae and between the third and fourth antennae.

When the antenna array includes first, second, third, fourth and fifth physical antennae, the DF signal obtaining module may be configured to generate first and second DF signals based on a first pair of antenna signal combinations $\psi_1-\psi_2$ and $\psi_3-\psi_4$, or a second pair of antenna signal combinations $\psi_1+\psi_3-\psi_2-\psi_4$ and $\psi_1+\psi_4-\psi_2-\psi_3$, generate eight cardioid DF signals based on the antenna signal combinations $\psi_1-\psi_2\pm i\beta\times\psi_5$, $\psi_3-\psi_4\pm i\beta\times\psi_5$, $\psi_1+\psi_3-\psi_2-\psi_4\pm i\beta\times\psi_5$ and $\psi_1+\psi_4-\psi_2-\psi_3\pm i\beta\times\psi_5$, wherein $\beta$ is an amplitude adjustment factor chosen such that the antenna gain pattern corresponding to each cardioid DF signal has a corresponding null direction. The incident signal angle determining module may be configured to, for each given frequency, calculate up to four estimated signal angles, each estimated signal angle based on a monotonically increasing function of the ratio of the measured values of signal power of the first and second DF spectra, and to determine the incident signal angle for the frequency based on the estimated signal angle which is closest to the null direction of the cardioid DF signal which has the lowest measured value of signal power for the frequency. The monotonically increasing function may be the arctangent of the square root of the ratio of the measured values of signal power of the first and second DF spectra.

According to a fourth aspect of the invention there is provided a system comprising an antenna array providing at least three antenna array elements, each antenna array element having a directionally dependent antenna gain pattern. The system comprises apparatus according to the third aspect of the invention.

According to a fifth aspect of the invention there is provided a system comprising an antenna array including first, second, third, fourth and fifth physical antennae, wherein the first, second, third and fourth antennae are arranged in a rectangular cruciform configuration and are equidistant a given distance from the fifth antenna and wherein the fifth antenna lies between the first and second antennae and between the third and fourth antennae. The system comprises apparatus according to the third aspect of the invention.

BRIEF DESCRIPTION OF THE DRAWINGS

Certain embodiments of the present invention will now be described by way of example, with reference to the accompanying drawings in which:

FIG. 4b schematically illustrates a DF signal sequence and a DF spectrum sequence produced in the sequential signalling configuration shown in FIG. 4a;

DETAILED DESCRIPTION OF CERTAIN EMBODIMENTS

Watson-Watt Direction Finding

Figure 1A:
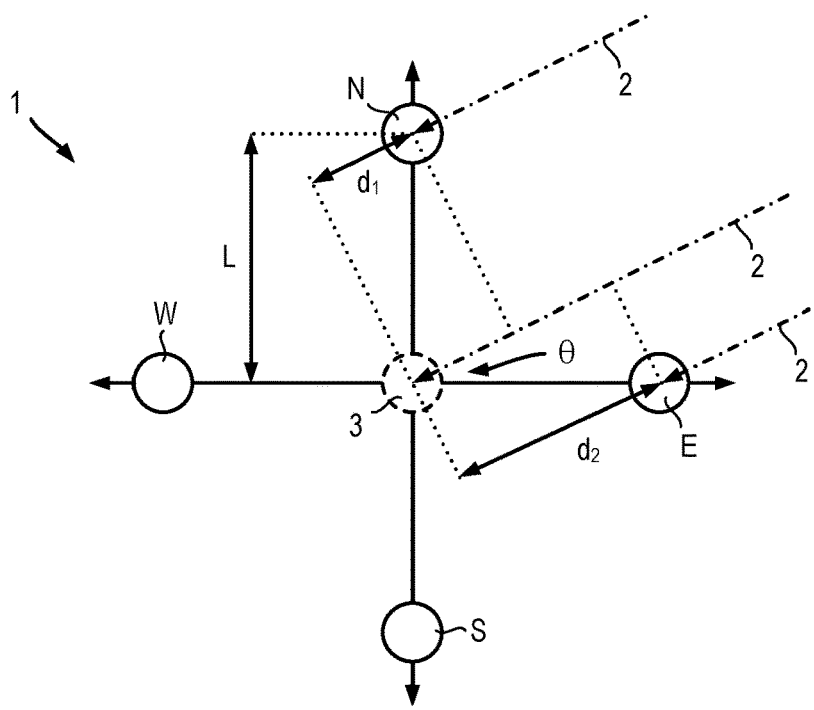
FIG. 1a schematically illustrates an Adcock antenna array for use in Watson-Watt direction finding.

FIG. 1a shows an Adcock antenna array used in a Watson-Watt method of direction finding which is useful for understanding the present invention.

The Watson-Watt method of direction finding uses an Adcock antenna array 1 which is typically an arrangement of four vertically polarised monopoles closely located in a square arrangement. In some systems a fifth antenna, known as a sense antenna, is provided at the centre of the Adcock antenna array 1. The antenna elements are labelled north N, south S, east E and west W, although they do not need to be aligned on actual compass directions. In an Adcock antenna array 1 adapted for higher frequencies, each antenna can be replaced by a pair of vertically polarised monopole antennae, the outputs of which are summed.

An RF signal 2 is incident at an angle θ to an arbitrarily selected reference direction. In this example, θ is the azimuthal angle. In the example shown in FIG. 1*a*, the reference direction is taken as the direction from the centre of the Adcock antenna array to the east Antenna E. Generally, the source of RF signal 2 is sufficiently far away from the Adcock antenna array 1 that the RF signal 2 is approximately a plane wave. The path length to the north N antenna is shorter by a first distance $d_1 = L \cdot \sin(\theta)$ relative to the centre of the Adcock antenna array 1, and the path length to the east antenna is shorter by a second distance $d_2 = L \cdot \cos(\theta)$. The voltage signals generated by each of the antennae in the Adcock antenna array 1 may be represented as:

$$\psi_N(t) = A(t)\exp(ik \cdot L \sin \theta) \quad (1.1)$$

$$\psi_S(t) = A(t)\exp(-ik \cdot L \sin \theta) \quad (1.2)$$

$$\psi_E(t) = A(t)\exp(ik \cdot L \cos \theta) \quad (1.3)$$

$$\psi_W(t) = A(t)\exp(-ik \cdot L \cos \theta) \quad (1.4)$$

In which $\psi_N$, $\psi_S$, $\psi_E$ and $\psi_W$ are the voltage signals from the north N, south S, east E and west W antennae respectively, A(t) is the time varying voltage signal which would be detected by a vertically polarised monopole located at the centre of the Adcock antenna array 1, i is the imaginary number and equal to the square root of −1, k is the magnitude of the wave-vector of RF signal 2 and L is the spacing of each antenna N, S, E, W from the centre of the Adcock antenna array 1. The wave-vector k is equal to $2\pi/\lambda$, in which λ is the wavelength. The antennae are arranged in pairs: north-south and east-west. The signals from these antennas are processed by combining the voltage signals from the north-south pair in a passive circuit known as a 180 degree hybrid. The output from the 180 degree hybrid is the vector subtraction of the N and S antennas:

$$\psi_{NS}(t) = \psi_N(t) - \psi_S(t) = 2iA(t)\sin(k \cdot L \sin \theta) \quad (2)$$

in which $\psi_{NS}$ is the result of taking the difference of north and south voltage signals $\psi_N$, $\psi_S$. Equation 2 can be simplified using a small angle approximation, provided that $k \cdot L \cdot \sin(\theta) \ll 1$:

$$\psi_{NS} = 2iA(t) \cdot k \cdot L \sin \theta \quad (3)$$

With correct spacing, L, between the antenna elements, this yields an azimuth polar pattern with a figure-of eight characteristic, in which each of the two lobes of the figure of eight closely approximate a circle with maximum sensitivity along the north-south axis and cancellation nulls along the east-west axis. An identical arrangement processes the E-W pair of antennas giving:

$$\psi_{EW} = 2iA(t) \cdot k \cdot L \cos \theta \quad (4)$$

in which $\psi_{EW}$ is the result of taking the difference of east and west voltage signals $\psi_E$, $\psi_W$. The incident signal angle is estimated by calculating the arctangent of the ratio of the signals from the north-south and east-west pairs:

$$\theta = \arctan\left(\frac{\psi_{NS}}{\psi_{EW}}\right) \quad (5)$$

Due to the periodicity of the arctangent function, an ambiguity of π radians (180 degrees) can arise. The π radian ambiguity can be resolved by further processing with an omni-directional signal $\psi_O$, derived either from a 'sense' antenna 3 located in the middle of the array, or alternatively, by synthesizing the omni-directional signal $\psi_O$ by summing the voltage signals from the north, s, east and west antennae $\psi_N$, $\psi_S$, $\psi_E$ and $\psi_W$.

Figure 1B:
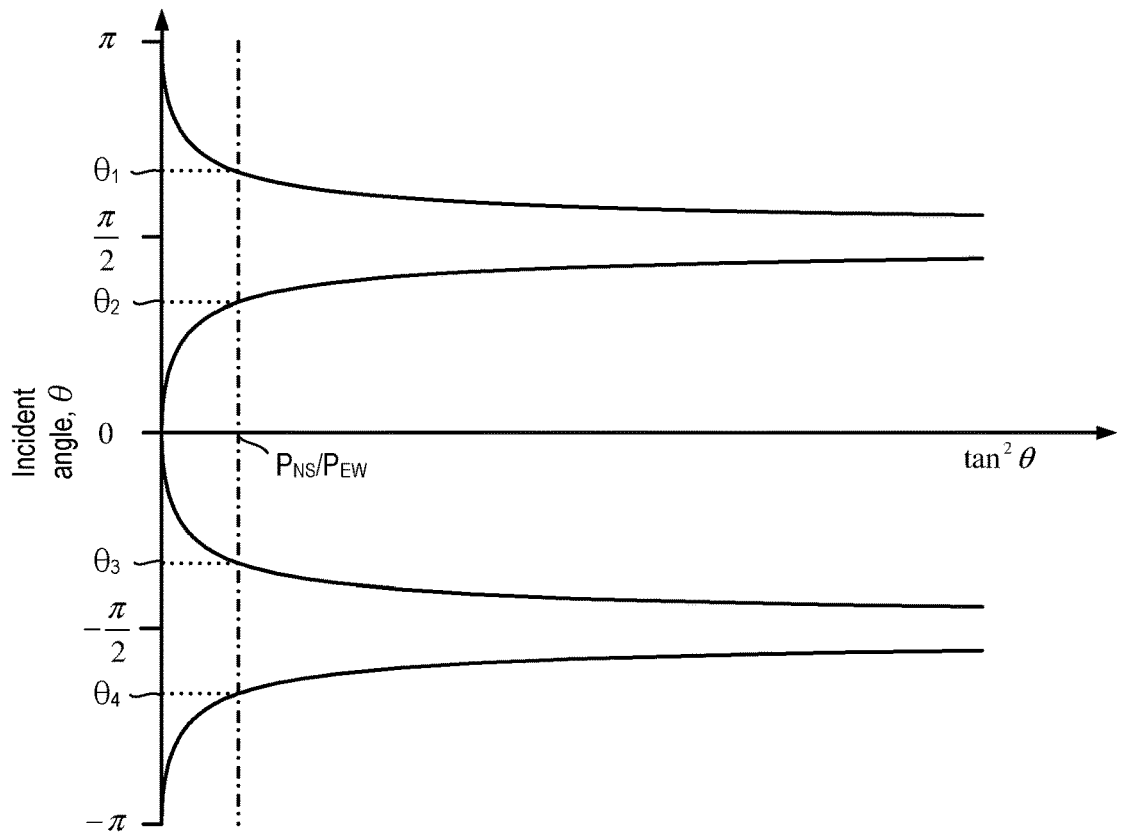
FIG. 1b schematically illustrates ambiguities which can arise when Watson-Watt methods are applied to signal power values.

The Watson-Watt method uses phase-coherent comparison of two (or three, with a central sense antenna included) voltage signal amplitudes. This is typically achieved by analogue-multiplexing the signals into a single radio receiver, which can only be applied to a single frequency band at any one time. The Watson-Watt method cannot be simply extended to perform direction finding using measured values of the RF signal 2 power, because the power measurement removes all phase information, including the sign of the voltage signal, for example:

$$P_{NS} = \psi_{NS} \cdot \psi^*_{NS} = 4A^2 k^2 L^2 \sin^2 \theta \quad (6.1)$$

$$P_{EW} = \psi_{EW} \cdot \psi^*_{EW} = 4A^2 k^2 L^2 \cos^2 \theta \quad (6.2)$$

in which $P_{NS}$ is the power of the north-south voltage signal $\psi_{NS}$ and $P_{EW}$ is the power of the east-west voltage signal $\psi_{EW}$. Thus, the ratio of the powers of north-south and east-west antenna signals is proportional to $\tan^2(\theta)$. FIG. 1*b* illustrates the value of $\tan^2(\theta)$ as a function of incident signal angle θ taken relative to the direction of the east E antenna.

Referring also to FIG. 1*b*, there are up to four possible incident signal angles $\theta_1$, $\theta_2$, $\theta_3$ and $\theta_4$ corresponding to any non-zero ratio $P_{NS}/P_{EW}$ of the powers of the north-south and east-west hybrid antenna signals $P_{NS}$, $P_{EW}$. Watson-Watt disambiguation methods do not work for direction finding using RF signal 2 power values because of the loss of the phase information.

Direction Finding System

Figure 2:
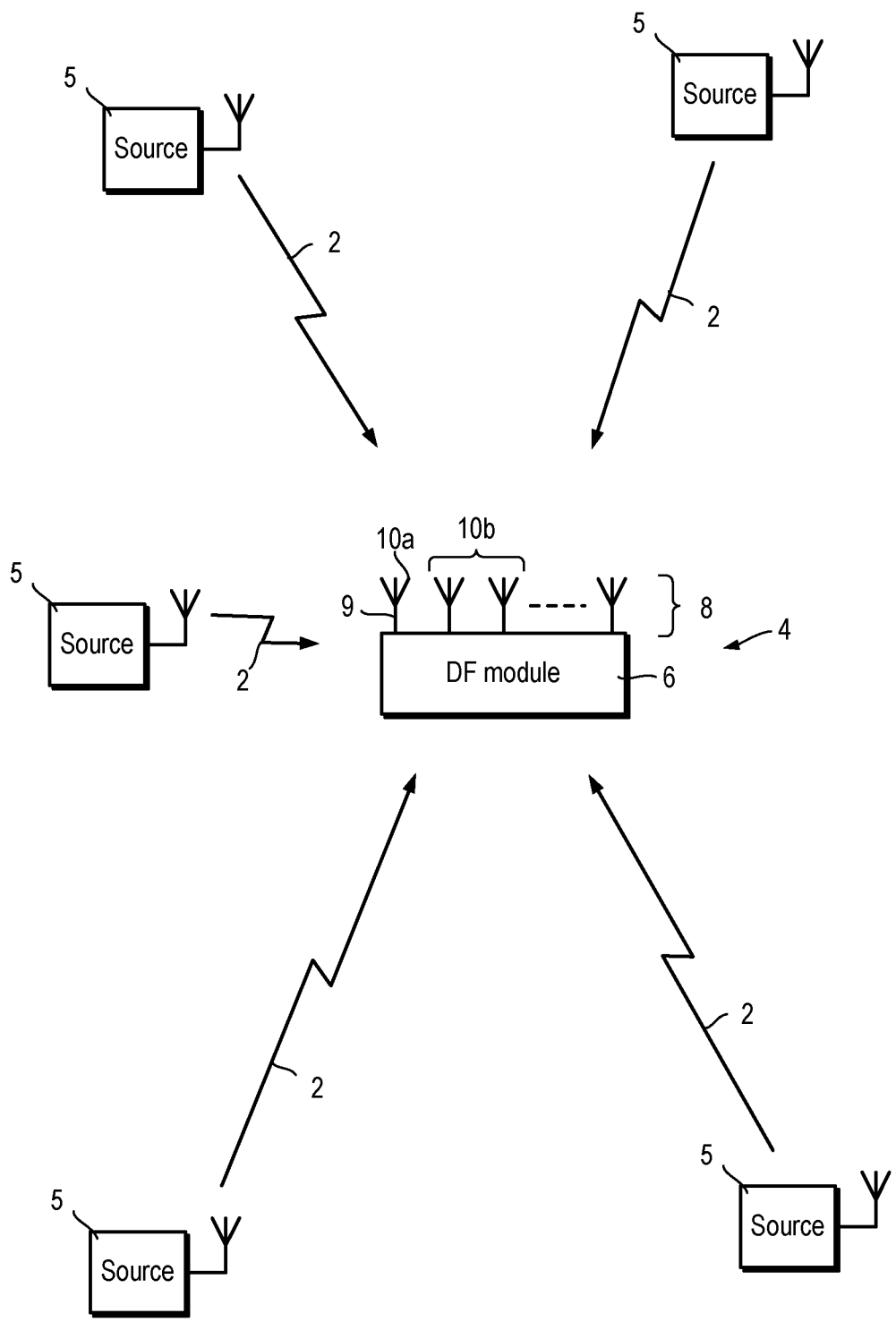
FIG. 2 schematically illustrates a direction finding system which includes a direction finding module, used to determine angles of arrival of RF signals transmitted by signal sources.
Figure 3:
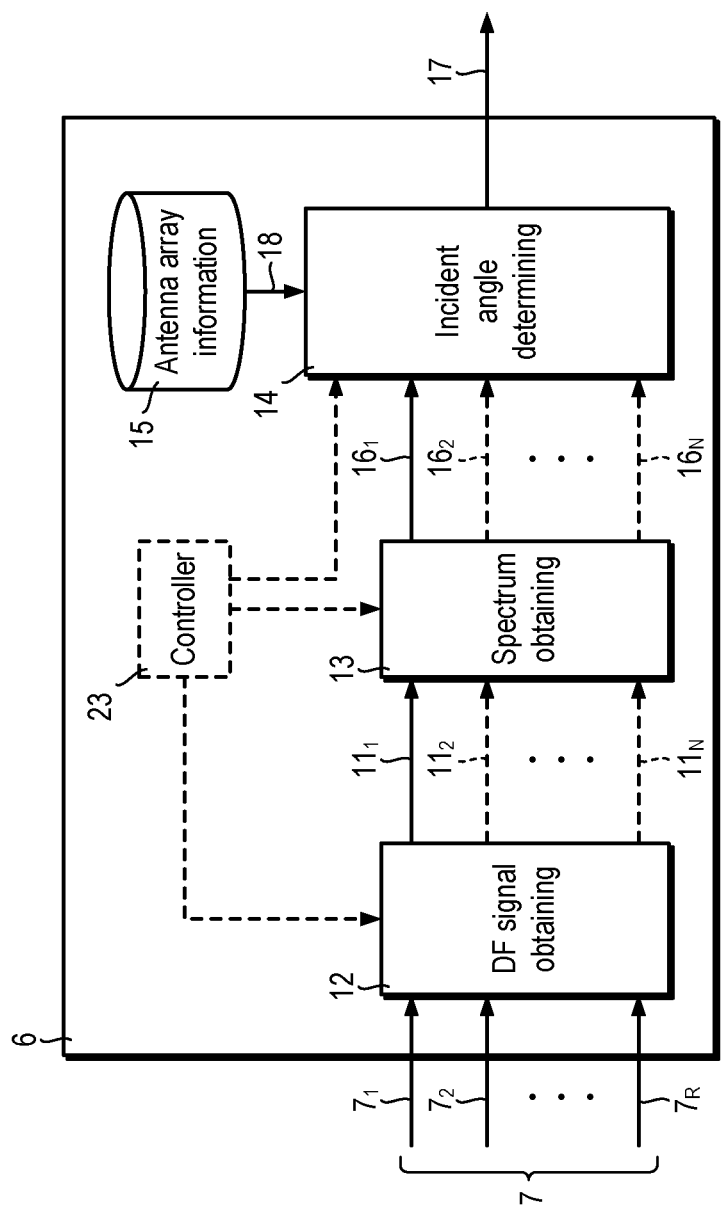
FIG. 3 is a schematic block diagram of a direction finding module shown in FIG. 2.

Referring to FIGS. 2 and 3, a direction finding system 4 including a direction finding module 6 shall be described.

The direction finding system 4 receives radio frequency (RF) signals 2 transmitted by signal sources 5. The direction finding system 4 (also referred to as a "DF system") includes a direction finding module 6 (also referred to as a "DF module") which receives and processes antenna signals 7 received from an antenna array 8.

The antenna array 8 includes a plurality of antennae 9. Each antenna 9 receives RF signals 2 and sends a corresponding antenna signal 7 to the DF module 6. Each antenna 9 may comprise one or more component antennae (not shown) which can be sensitive to different frequencies or in different directions, and the antenna signal 7 may be produced by combining signals from the component antennae. Some signal processing may be integrated into an antenna 9, for example amplification or filtering. The antenna array 8 may include antennae 9 of a single type, or the antenna array 8 may include multiple types of antennae 9. For example, each antenna 9 may be a monopole antenna, a loop antenna, a dipole antenna, a Yagi antenna, a dish antenna or any other suitable type of antenna. Further examples of antenna arrays 8 useful for methods of direction finding using power measurements will be described hereinafter.

The antennae 9 are organised into antenna array elements 10. An antenna array element 10 may be a physical antenna array element 10*a* comprising one antenna 9. Alternatively, an antenna array element 10 may be a "hybrid" antenna array element 10*b* (also referred to as a "composite" or "virtual" antenna array element). A hybrid antenna array element 10*b* is a combination of one or more antennae 9. As shall be explained in further detail hereinafter, the DF module 6 receives antenna signals 7 from the antennae 9, however, the DF module 6 generates direction finding signals 11 (also referred to as "DF signals") corresponding to the antenna array elements 10.

For example, if a particular antenna array 8 includes first, second and third antennae (not shown) and the DF system 4 uses physical antenna array elements 10$a$, then the DF module 6 will generate first, second and third DF signals (not shown) based on the respective first, second and third antenna signals (not shown). If the same DF system 4 was modified to use hybrid antenna array elements 10$b$ instead, then the DF module 6 may generate DF signals 11 based on linear combinations of the first, second and third antenna signals, for example, the sum of first and second antenna signals, or the difference of the third and first antenna signals.

In the following, for clarity, when describing a DF system 4 which uses hybrid antenna array elements 10$b$, a given DF signal 11 is described as being a linear combination of antenna signals 7, even if the given DF signal 11 is based on only one antenna signal 7. A direction finding system 4 which uses hybrid antenna array elements 10$b$ need not generate a DF signal 11 corresponding to every possible combination of antenna signals 7, and in general a DF system 4 will generate DF signals 11 corresponding to a particular set of hybrid antenna elements 10$b$. The set of hybrid antenna elements 10$b$ may be selected in dependence on the particular method of direction finding using measured power values in use. The set of hybrid antenna elements 10$b$ used by a DF system 4 may be configured during fabrication so that the DF module 6 produces DF signals 11 corresponding to particular linear combinations of the antennae signals 7. Alternatively, the DF system 4 may dynamically select a set of hybrid antenna elements 10$b$ to use for direction finding based on user input, or based on the properties of the antennae signals 7 being received by the DF module 6.

The same physical antenna array 8 can be used to generate DF signals 11 corresponding to antenna gain patterns 22 (FIG. 7) with different directional dependences without modifying the antenna array 8. Thus, using hybrid antenna array elements 10$b$ can improve the versatility of a DF system 4.

Direction Finding Module 4

Referring to FIG. 3, an example of a direction finding module 6 is described in further detail.

The DF module 6 includes a direction finding signal obtaining module 12 (herein also referred to as a "DF signal obtaining module"), a spectrum obtaining module 13, an incident angle determining module 14, and an antenna array information storage 15. The DF signal obtaining module 12 receives antenna signals $7_1, \ldots, 7_R$, one for each of R antennae 9 in the antenna array 8, and generates the DF signals 11 based on the antenna signals $7_1, \ldots, 7_R$. The DF signal obtaining module 12 generates a DF signal $11_1, \ldots, 11_N$ corresponding to each of N antenna array elements 10. The DF signals $11_1, \ldots, 11_N$ may be generated simultaneously or successively. The DF signal obtaining module 12 may also perform standard RF signal processing such as amplification and filtering. In this example the DF signal obtaining module 12 is implemented using analogue RF circuitry. The analogue RF circuitry may be digitally controlled by the controller 23, which may be a FPGA or a microcontroller.

The spectrum obtaining module 13 receives the DF signals $11_1, \ldots, 11_N$ and generates corresponding direction finding spectra $16_1, \ldots, 16_N$ (herein also referred to as "DF spectra"). The spectrum obtaining module 13 demodulates each DF signal $11_1, \ldots, 11_N$ from RF to baseband frequencies and performs analogue to digital signal conversion before obtaining the respective DF spectra $16_1, \ldots, 16_N$. Each DF spectrum $16_1, \ldots, 16_N$ is a power spectrum, i.e. a DF spectrum 16 is composed of measured values of signal power at respective given frequencies. Each DF spectrum 16 is preferably generated using a windowed fast Fourier transform (FFT) method. The DFT spectrum of a DF signal 11 may alternatively be generated using a fast Fourier transform (FFT) method, or any other standard spectrum estimation method. The spectrum obtaining module 13 performs demodulation to baseband of a bandwidth $\Delta f$ centred on a central RF frequency, $f_c$, which may be varied by a user or sequentially set according to a pre-programmed sequence provided by a user. In this example, the spectrum obtaining module 13 is provided by an analogue RF front end to perform the demodulation to baseband, combined with a FPGA to implement the ADC and windowed FFT. However, the spectrum obtaining module 13 may alternatively be provided by a dedicated microchip or microprocessor, or some or all of the functions of the spectrum obtaining module 13 may be provided by a suitably programmed computer.

The incident angle determining module 14 calculates incident signal angle data 17 based on the DF spectra $16_1, \ldots, 16_N$ and antenna array information 18 received from the antenna array information storage 15. The incident signal angle data 17 includes a separate incident signal angle $\theta$ calculated for each given frequency included in the bandwidth of the DF spectra $16_1, \ldots, 16_N$. The incident signal angle data 17 may include other information for each given frequency. For example, a quality and/or confidence estimate corresponding to the calculated incident signal angle $\theta$. In this example, the incident angle determining module 14 is implemented by a suitably programmed microprocessor. However, the incident angle determining module 14 may alternatively be provided by a FPGA or by a suitably programmed computer. The antenna array information storage 15 may be provided by solid state memory such as Flash or similar non-volatile memories. Alternatively, the antenna array information storage 15 may be provided by magnetic, optical or any other machine readable storage media.

As explained earlier, if the DF system 4 (FIG. 2) uses physical antenna array elements 10$a$, the DF signal obtaining module 12 generates DF signals 11 corresponding to respective antenna signals received from the individual physical antenna array elements, i.e. N=R, or N<R. Alternatively, if the DF system 4 (FIG. 2) uses hybrid antenna array elements 10$b$, the DF signal obtaining module 12 generates the DF signals 11 based on a set of linear combinations of the antenna signals 7, and each linear combination of the antenna signals 7 corresponds to a respective hybrid antenna array element 10$b$. In other words, N<R, N=R or N>R are possible, depending on the set of linear combinations selected. The DF signal obtaining module 12 may perform other processes such as, for example, applying phase shifts, amplifying and/or filtering the antenna signals 7.

Figure 4A:
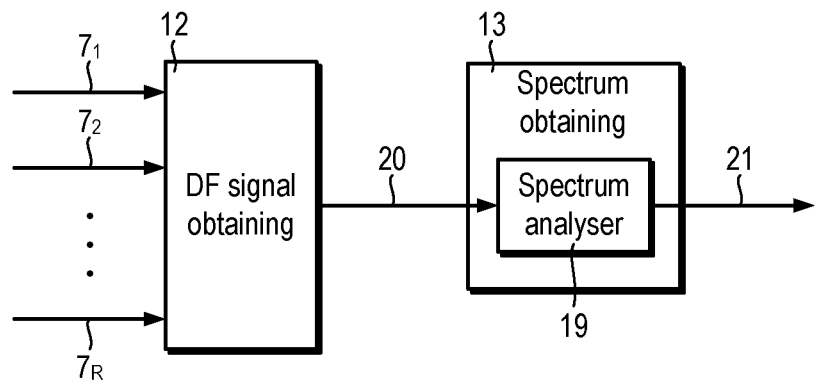
FIG. 4a is a schematic block diagrams of a sequential signalling configuration of a direction finding signal obtaining module and a spectrum obtaining module shown in FIG. 3.
Figure 4B:
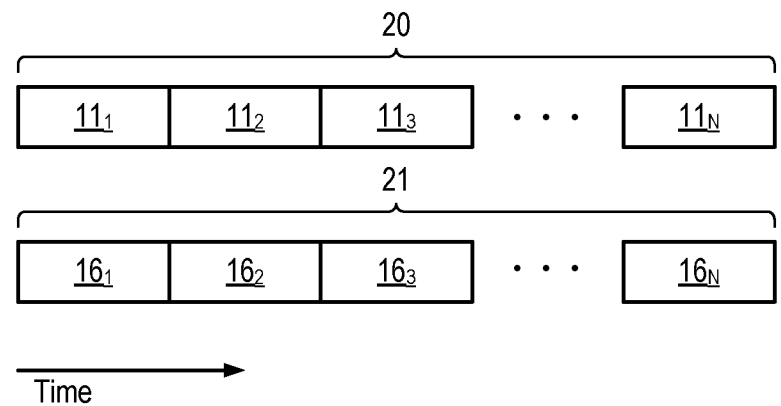

Referring also to FIGS. 4$a$ and 4$b$, an example is shown of the DF signal obtaining module 12 and the spectrum obtaining module 13 in the case when the spectrum obtaining module 13 includes a single spectrum analyser 19. In this case, the spectrum obtaining module 13 includes a single spectrum analyser 19 which obtains the DF spectrum 16 of a received DF signal 11. In this case, the DF signal obtaining module 12 generates DF signals $11_1, \ldots, 11_N$ sequentially, i.e. one followed by the next, and sends a DF signal sequence 20 to the spectrum obtaining module 13. The spectrum obtaining module 13 receives the DF signal sequence 20 and the spectrum analyser 19 generates a corresponding DF spectrum sequence 21. The incident angle determining module 14 receives the DF spectrum sequence 21 and calculates the incident signal angle data 17. The spectrum analyser 19 may generate the DFT spectrum 16 corresponding to each DF signal 11 using a FFT method. The DF signal/spectrum sequence 20, 21 may additionally include guard intervals and/or periods of inactivity which separate the DF signals/spectra 11, 16 which comprise the DF signal/spectrum sequence 20, 21.

Figure 4C:
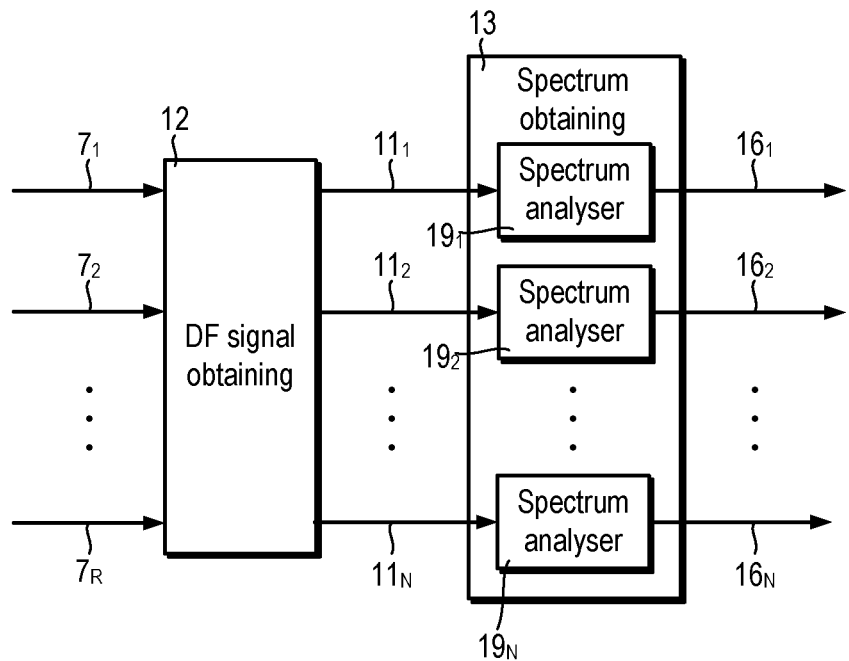
FIG. 4c is a schematic block diagram of a simultaneous signalling configuration of a direction finding signal obtaining module and a spectrum obtaining module shown in FIG. 3.

Referring also to FIG. 4c, an example is shown of the DF signal obtaining module 12 and the spectrum obtaining module 13 in the case when the spectrum obtaining module 13 includes a separate spectrum analyser $19_1, \ldots, 19_N$ corresponding to each DF signal $11_1, \ldots, 11_N$. In this case, the spectrum obtaining module 13 includes a respective spectrum analyser $19_1, \ldots, 19_N$ corresponding to each DF signal $11_1, \ldots, 11_N$. The DF signal obtaining module 12 generates the DF signals $11_1, \ldots, 11_N$ simultaneously, i.e. at the same time/in parallel. Each spectrum analyser $19_1, \ldots, 19_N$ included in the spectrum obtaining module 13 receives one of the DF signals $11_1, \ldots, 11_N$ and generates the respective DF spectra $16_1, \ldots, 16_N$. Each spectrum analyser 16 may obtain the DFT spectrum of a DF signal 11 using a FFT method.

It will be appreciated that intermediate configurations of the DF signal obtaining module 12 and the spectrum obtaining module 13 are possible, which can include more than one spectrum analyser 19 and fewer than N spectrum analysers.

The antenna array information 18 includes information about the configuration of the antennae 9. The configuration information may include information about the relative positions, orientations and physical size and/or shape of the antennae 9. The antenna array information 18 also includes information about the antenna gain patterns 22 (FIG. 7) corresponding to each of the antenna array elements 10 used as the basis for generating DF signals 11. Some of the antenna gain patterns 22 may be directionally dependent, i.e. the antenna gain may be a function of the incident signal angle θ. Some or all of the antenna gain patterns 22 may also be frequency dependent. Each of the antenna gain patterns 22 may be theoretically calculated or, preferably, directly measured/calibrated using calibration signal sources 5.

The incident angle determining module 14 calculates the incident signal angle data 17 based on the received DF spectra 16 and antenna array information 18 received from the antenna array information storage 15. The incident angle determining module 14 uses the measured power values from the DF spectra 16 to calculate a separate incident angle θ for each given frequency included in the bandwidth of the DF spectra 16. A DF spectrum 16 may be obtained for a relatively wide bandwidth. Thus, a separate incident angle θ may be calculated for each given frequency included in the bandwidth of the DF spectra 16. For example, the bandwidth of a DF spectrum 16 may be at least 1 MHz, at least 10 MHz, at least 100 MHz or greater, depending on the type of antennae 9 used and the sampling bandwidth of the signal demodulator included in the radio module (not shown). Further examples of methods of calculating the incident signal angle data 17 follow hereinafter.

Depending on the particular method used to calculate the incident signal angle data 17, a controller 23 may be included to coordinate the actions and/or timings of the DF signal obtaining module 12, the spectrum obtaining module 13 and the incident angle determining module 14. The controller may additionally make dynamic selections of a set of hybrid antenna array elements 10b used to generate the DF signals 11. The controller 23 is provided by an electronic module, preferably a field programmable gate array (FPGAs). Alternatively, the controller 23 may be provided by a microcontroller or microprocessor. As will be apparent, some or all of the functions of the controller 23 can be implemented by software running on a computer.

The DF signal obtaining module 12 need not be provided by analogue RF circuitry. Alternatively, the DF signal obtaining module 12 may be digitally implemented using multiple, synchronised, analogue to digital converters combined with a field programmable gate array (FPGA) or a suitably programmed computer to perform signal processing. In such an example, the spectrum obtaining module 13 need not perform analogue to digital conversion.

Method of Direction Finding Using Signal Power

Figure 5:
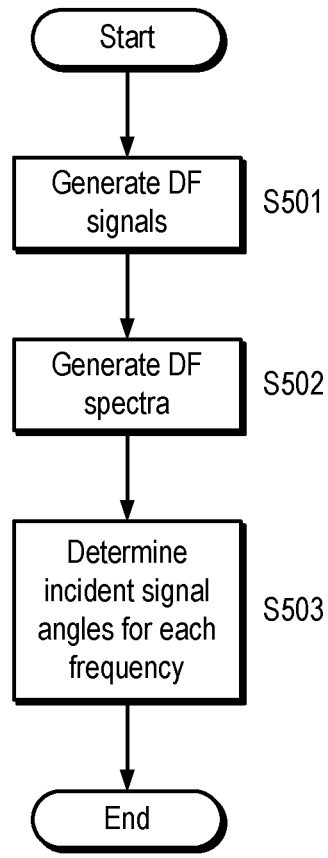
FIG. 5 is a process flow diagram for a method of direction finding using measured values of signal powers.

Referring to FIG. 5, a method of direction finding using signal power measurements is explained.

The DF signal obtaining module 12 generates the DF signals 11 based on received antenna signals 7 (step S501). As explained earlier, the DF signal obtaining module 12 may generate each of the DF signals $11_1, \ldots, 11_N$ simultaneously, or the DF signal module 12 may generate a first DF signal $11_1$, followed by a second DF signal $11_2$ and so on to send a DF signal sequence 20 to the spectrum obtaining module 13.

The spectrum obtaining module 13 receives the DF signals $11_1, \ldots, 11_N$ and calculates a DF spectrum $16_1, \ldots, 16_N$ corresponding to each of the DF signals $11_1, \ldots, 11_N$ (step S502). In the case that the spectrum obtaining module 13 is receiving the DF signals $11_1, \ldots, 11_N$ as a DF signal sequence 20, the spectrum obtaining module 13 may receive the first DF signal $11_1$ and calculate the first DF spectrum $16_1$ whilst the DF signal obtaining module 12 is generating the second DF signal $11_2$. In other words, the processes of generating the DF signals 11 and generating the DF spectra 16 may occur concurrently/simultaneously.

The incident angle determining module 14 calculates the incident signal angle data 17 (step S503). The incident signal angle data 17 is calculated based on the received antenna array information 18 and the measured power values from the received DF spectra $16_1, \ldots, 16_N$. The incident signal angle data 17 includes a separate incident signal angle θ calculated for each given frequency included in the bandwidth of the DF spectra 16. The incident angle determining module 14 refers each initially calculated incident signal angle θ to a calibration look-up table (not shown) stored in the antenna array information storage 15. The entry in the calibration look-up table corresponding to the initially calculated incident signal angle θ stores a correction factor determined during calibration of the DF system 4, which is applied to the initially calculated incident signal angle $θ_k$ to remove systematic biases. Examples of particular methods for calculating a separate incident signal angle θ for each given frequency included in the bandwidth of the DF spectra 16 follow hereinafter. These DF methods shall be explained with reference to examples of specific antenna array 8 configurations. However, the methods explained hereinafter are applicable to a wide variety of antenna array configurations, and the required parameters of antennae 9 and antenna arrays 8 suitable for use with the herein described methods shall be clear from the detailed descriptions of each particular method.

The DF system 4 may be swept through a range of central frequencies $f_c$ in succession, and the corresponding DF spectra 16 so obtained correspond to a bandwidth Δf about each successive central frequency $f_c$. For example, the DF system may be swept across a wide frequency range in 10 MHz increments. Larger or smaller frequency increments could be used, for example, of the order of 10 KHz, 100 KHz, 1 MHz, 10 MHz, 100 MHz or larger than 100 MHz, dependent on the frequency and bandwidth characteristics of the antennae 9, the DF signal obtaining module 12 and the spectrum obtaining module 13.

First Type of DF System 4a

Figure 6A:
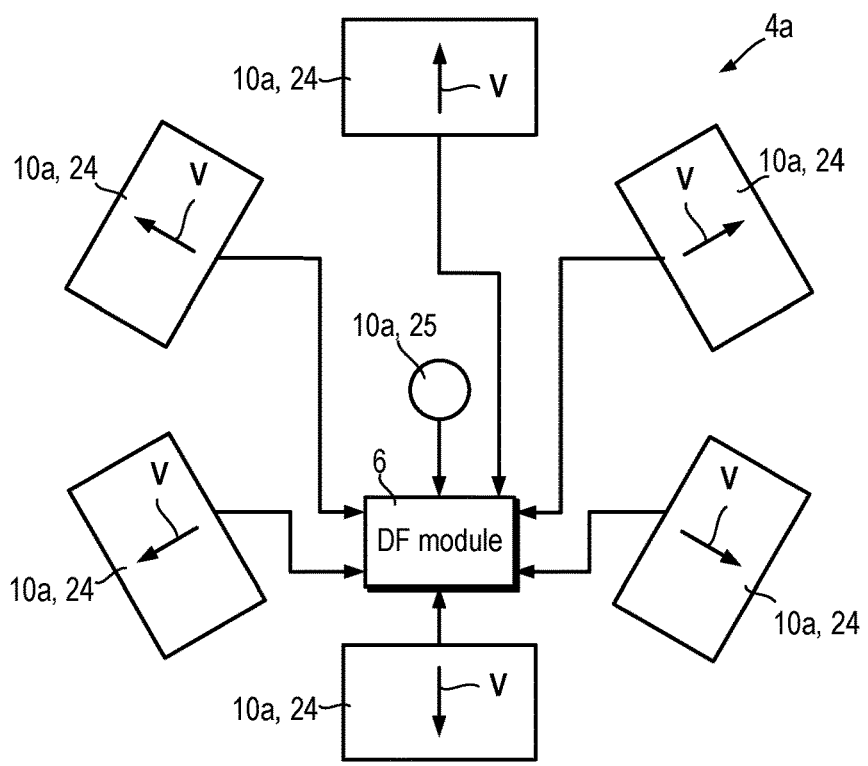
FIG. 6a is a plan view of a first type of direction finding system.
Figure 6B:
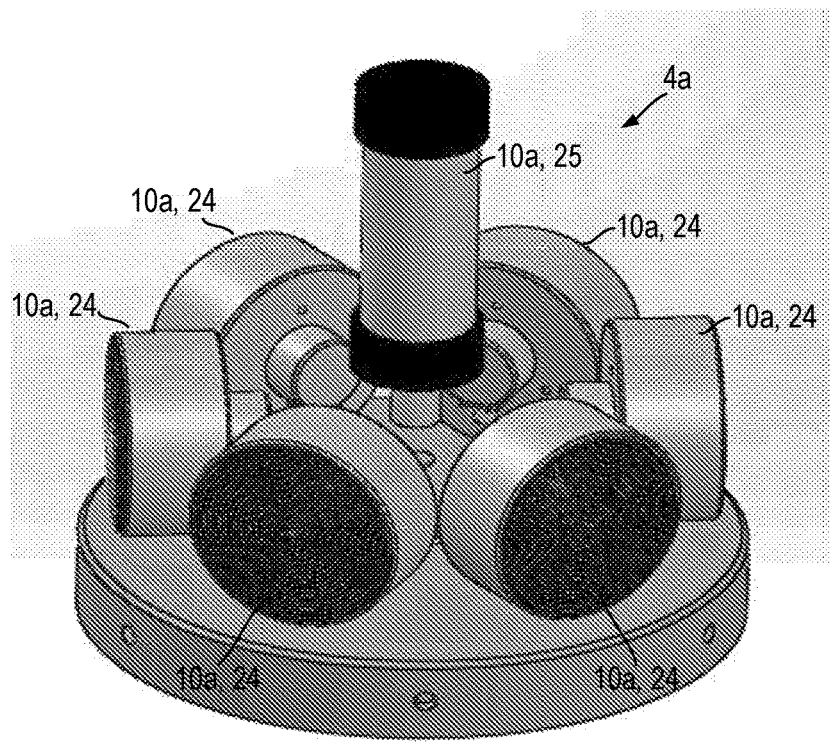
FIG. 6b is a perspective view of a first type of direction finding system.
Figure 7:
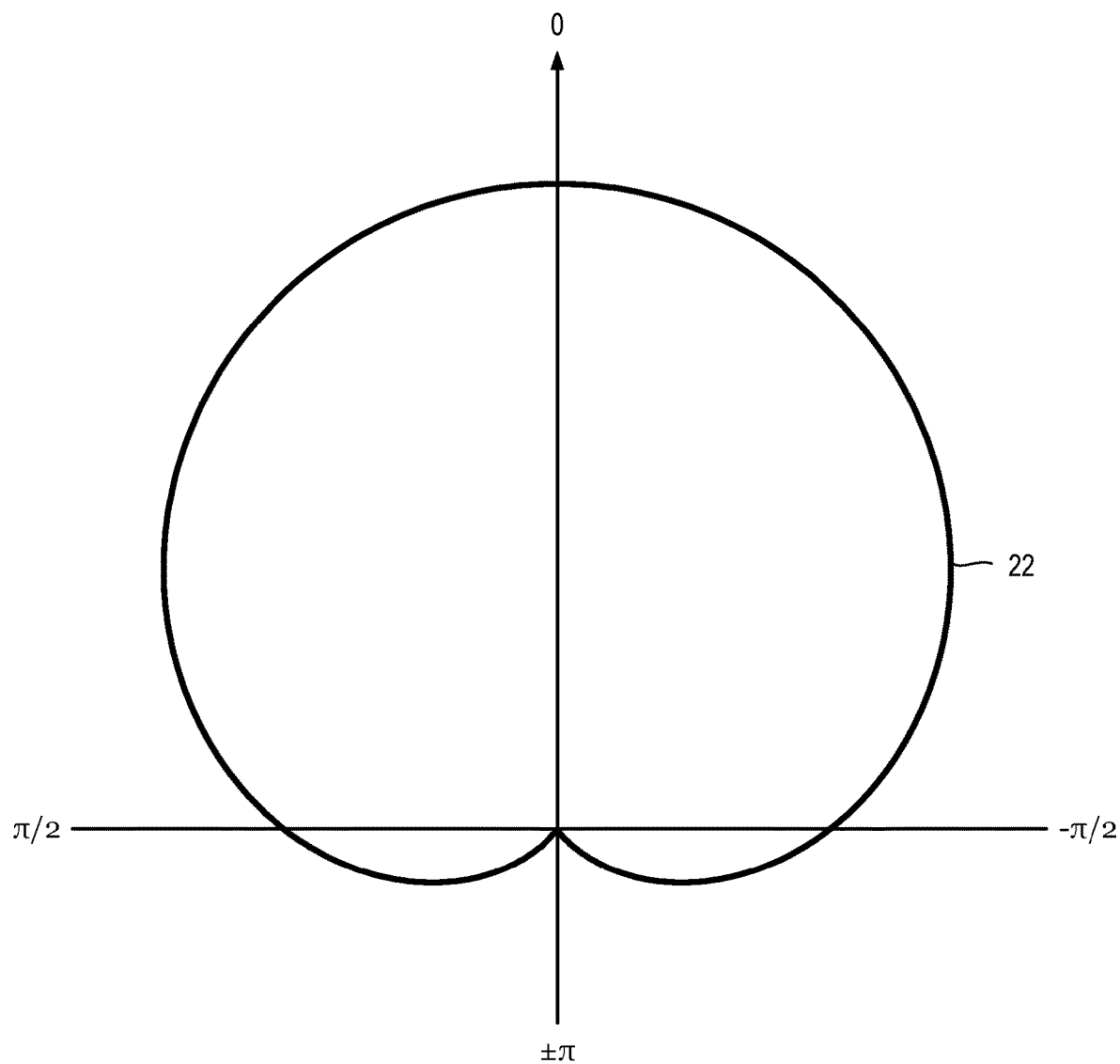
FIG. 7 schematically illustrates a directionally dependent antenna gain pattern.

FIG. 6a shows a schematic plan view of a first type of DF system 4a. FIG. 6b shows a perspective view the first type of DF system 4a. FIG. 7 shows an example of a directionally dependent antenna gain pattern 22.

Referring to FIGS. 6a and 6b, a first type of DF system 4a uses physical antenna array elements 10a, and includes a DF module 6 and seven physical antenna array elements 10a. Six of the physical antenna array elements 10a are directional antennae 24 arranged in regular hexagonal configuration. The seventh physical antenna array element 10a is a centrally positioned omnidirectional antenna 25 such as, for example, a vertically polarised monopole antenna.

The omnidirectional antenna 25 may be omitted in some examples of the first type of DF system 4a. There need not be six directional antennae 24. More or fewer directional antennae 24 can be used. For example, as few as three or as many as seven, eight, nine, ten, twenty or more directional antennae 24 can be included in the first type of DF system 4a. Hereinafter, methods of calculating incident signals angles θ using the first type of DF system 4a will be explained with reference to a general number of directional antennae 24. Because the first type of DF system 4a uses physical antenna array elements 10a, the DF signal obtaining module 12 generates a DF signal 11 corresponding to a respective antenna signal received from an individual physical antenna array element 10a (i.e. an individual antenna 9, 24, 25). A DF signal may be generated corresponding to each of the physical antenna array elements 10a, i.e. N=R. In cases when an omnidirectional antenna 25 is included, there will be R−1 directional antennae 24 and one omnidirectional antenna 25. If the omnidirectional antenna 25 is not used, there will be R directional antennae 24.

Referring also to FIG. 7, each of the directional antennae 24 has a corresponding antenna gain pattern 22. The antenna gain pattern 22 shown in FIG. 7 is a Gaussian antenna gain pattern 22 (also referred to as normally distributed), for example:

$$G(\theta) = B\exp\left(-\frac{\theta^2}{C}\right) \quad (7)$$

in which G(θ) is the antenna gain, i.e. the constant of proportionality between the power of an RF signal 2 incident at an azimuthal angle θ and the power of the corresponding antenna signal 7 produced by the antenna 9. Herein, when reference is made to an antenna gain pattern 22, it should be understood that this describes power gain, not amplitude gain. The constant B is an amplification pre-factor, θ is the incident angle with respect to the direction in which the antenna gain is a maximum, defined for −π<θ≤π, and C is a constant related to the rate that the antenna gain G drops with incident angle θ away from $\theta_O$. The directional antennae 24 need not have Gaussian antenna gain patterns. For example, an alternative directionally dependent antenna gain pattern is given by:

$$G(\theta) = B(1+\cos\theta) \quad (8)$$

in which B again represents an amplification pre-factor. Preferably, each of the directional antennae 24 has a substantially similar antenna gain pattern 22. The directional antennae 24 need not be identical though, provided that the respective antenna gain patterns 22 are stored in the antenna array information storage 15.

Each directional antenna 24 has an associated direction vector V. The direction vector V relates to a distinctive point in the respective antenna gain pattern 22 of the directional antenna 24. For example, in the case that a directional antenna 24 has the Gaussian antenna gain pattern 22 as Equation 7, the direction vector V can be aligned with the direction θ=0 corresponding to the maximum antenna gain. The first type of DF system 4a is preferably configured so that the direction vectors V of the directional antennae 24 are approximately evenly distributed across all angles. However, in an application where RF signals 2 are only anticipated/desired to be received from a reduced range of incident angles θ, the directional antennae 24 may be orientated to cover a reduced range of angles.

The directional antennae 24 are preferably positioned around the perimeter of a regular polygonal shape, for example a regular hexagon as shown in the example of FIGS. 6a and 6b, when R=7 and an omnidirectional antenna 25 is included. The configuration may be alternately expressed as positioned around the perimeter of a circle in an equiangular configuration. Alternatively, the directional antennae 24 may be positioned around the perimeter of other shapes. For example, more than four directional antennae 24 could be placed around the perimeter of a square. The directional antennae 24 could be positioned along a horizontal line, or they could be placed vertically one above the other.

The first type of DF system 4a need not be configured so that the direction vectors V of the directional antennae 24 are coplanar. Alternatively, the directional antennae 24 may be positioned and orientated such that the respective direction vectors V are non-coplanar. In such an example, the first type of DF system 4a may be used for finding both the incident azimuthal angle θ and the incident elevation angle χ. For example, in a case where the directional antennae 24 were evenly distributed across the surface of a sphere or a hemisphere and orientated with the respective direction vectors V perpendicular to the surface of the sphere/hemisphere.

Second DF System 4b

Figure 8A:
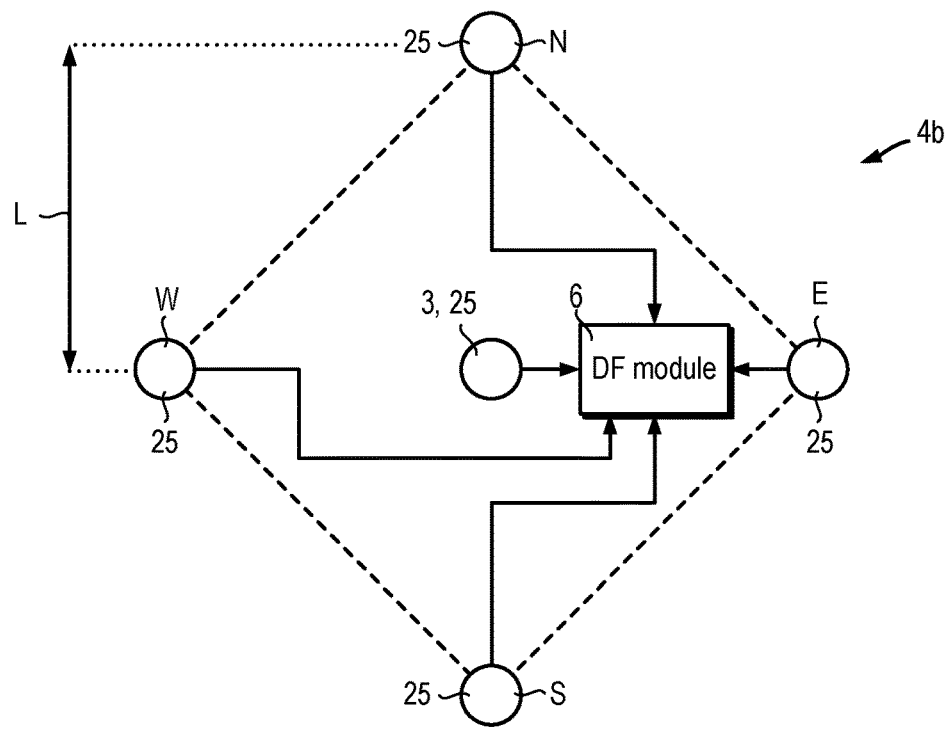
FIG. 8a is a plan view of a second type of direction finding system using individual monopole antennae.

FIG. 8a shows a schematic plan view of a second type of DF system 4b.

Referring to FIG. 8a, the second type of DF system 4b uses hybrid antenna array elements 10b. The second type of DF system 4b includes the DF module 6 and an antenna array 8 made up of five omnidirectional antennae 25. Each omnidirectional antenna 25 is a vertically polarised monopole antenna. The antenna array 8 of the second type of DF system 4b is similar to an Adcock antenna array including a central sense antenna 3. The antenna array 8 includes first, second, third and fourth omnidirectional antennae generally in a cruciform arrangement centred on the fifth omnidirectional antenna. Herein, the first, second, third and fourth antennae are referred to as north, south, east and west antennae respectively, or simply as "N", "S", "E" and "W". The north N, south S, east E and west W antennae are positioned at the corners of a square, and are each a distance L from the centrally positioned sense antenna 3. Although the antennae N, S, E, W have been referred to as north, south, east and west, the antenna array 8 does not need to be aligned to compass directions. The fifth omnidirectional antenna 25 is not essential, and in some examples may be omitted. When the fifth omnidirectional antenna 25 is omitted, the corresponding fifth antenna signal 7 can be estimated by summing the antenna signals 7 from the first, second, third and fourth antennae N, S, E, W.

The direction finding module 6 receives the antenna signals 7 from each of the five omnidirectional antennae 25. The direction finding module 6 in the second type of DF system 4b generates DF signals 11 corresponding to hybrid antenna array elements 10b. Each of the DF signals 11 generated by the second type of DF system 4b corresponds to a linear combination of antenna signals 5 from the north N, south S, east E, west W and sense 3 antennae. Examples of possible linear combinations of the antenna signals follow hereinafter.

Figure 8B:
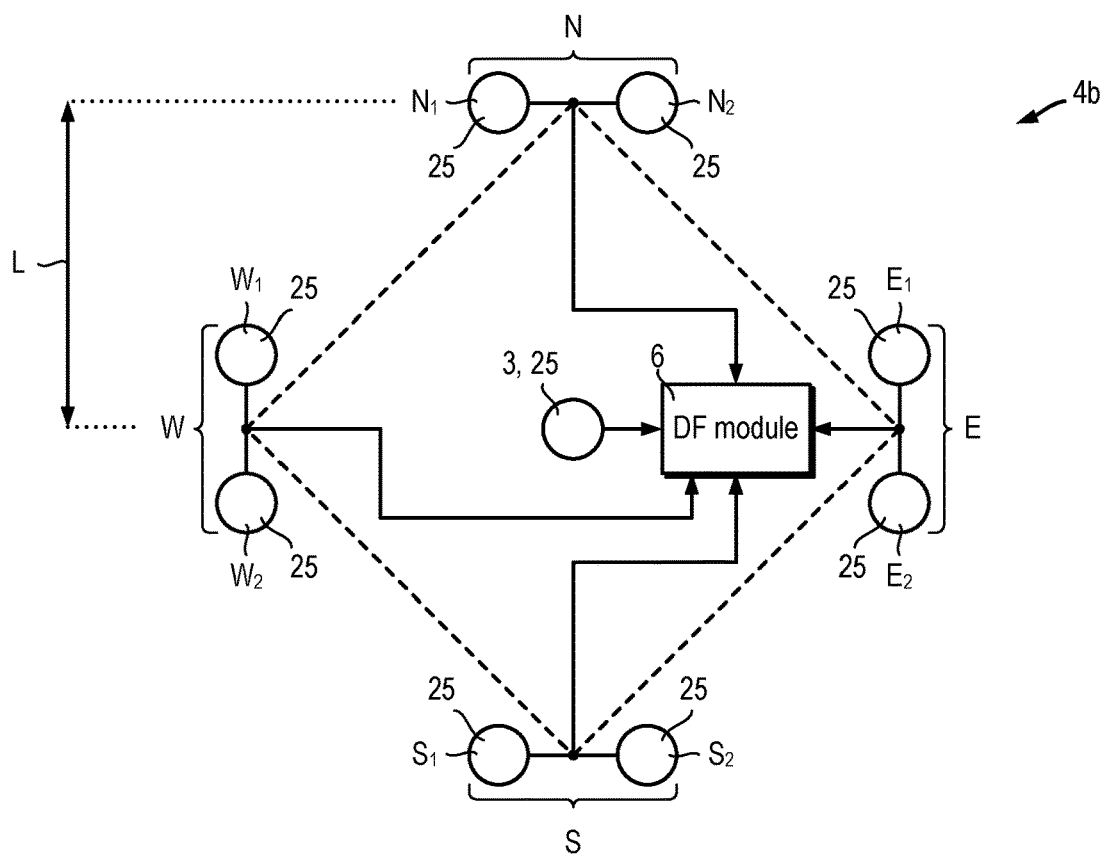
FIG. 8b shows a plan view of a second type of direction finding system using summed pairs of monopole antennae.

Referring also to FIG. 8b, the north N, south S, east E and west W antennae may alternatively be provided by a summed pairs of monopole antennae. For example, the north N antenna may provide an antenna signal $\psi_N$ which is formed by summing the signals of a pair of closely spaced vertically polarised monopole antennae $N_1$, $N_2$. Each of the south S, east E and west W antennae may be provided in the same way. Using summed pairs of monopole antennae can improve performance of the second type of DF system 4b at higher frequencies.

The second type of DF system 4b need not use monopole antennae, alternatively, the antennae N, S, E, W of the second type of DF system 4b may be provided by individual dipole antennae or by summed pairs of dipole antennae.

The second type of DF system 4b generates DF signals 11 corresponding to hybrid antenna array elements 10b. Each hybrid antenna array element 10b corresponds to a particular linear combination of the north $\psi N$, south $\psi_S$, east $\psi_E$, west $\psi_W$ and sense $\psi_O$ antenna signals 7. In this example, the DF signals 11 corresponding to hybrid antenna array elements 10b are generated by combining the antenna signals 7 in the analogue RF circuitry of the DF signal obtaining module 12, before the demodulation to baseband.

Figure 9A:
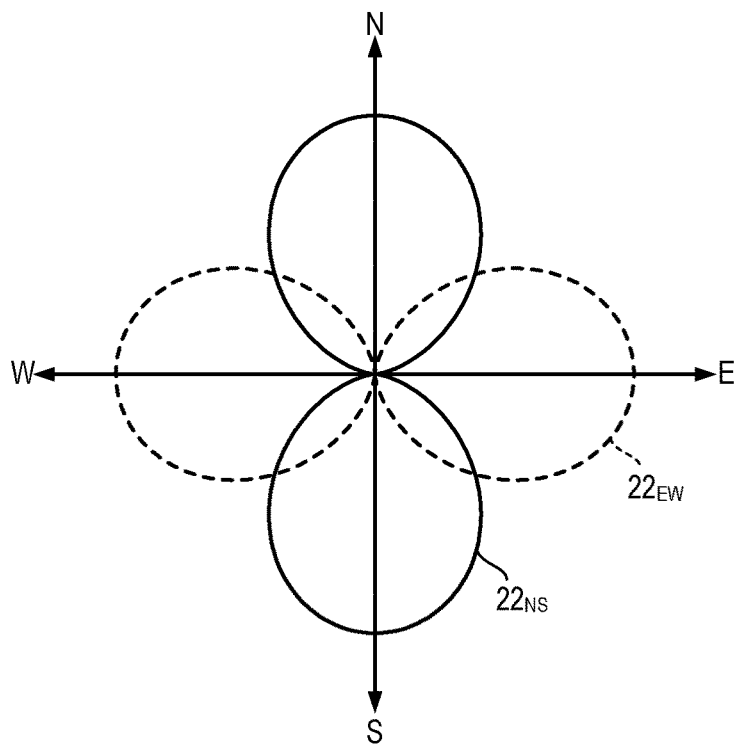
FIG. 9a schematically illustrates figure-of-eight antenna gain patterns associated with direction finding signals obtained using a first group of hybrid antenna array elements with the second example of a direction finding system.
Figure 9B:
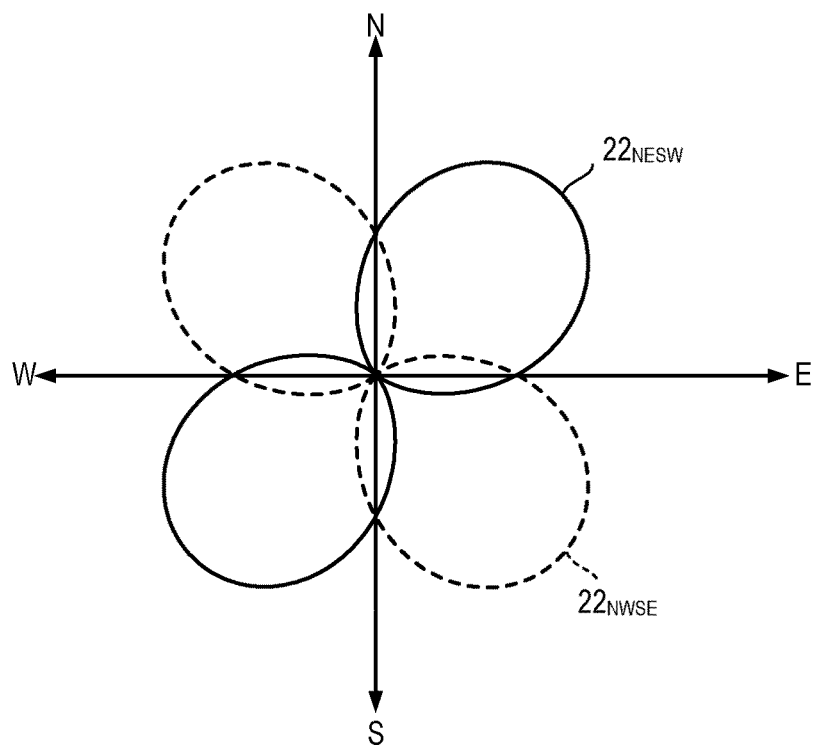
FIG. 9b schematically illustrates figure-of-eight antenna gain patterns associated with direction finding signals obtained using a first group of hybrid antenna array elements with the second example of a direction finding system.

Referring also to FIGS. 9a and 9b, a first group of hybrid antenna array elements 10b are described. The first group of hybrid antenna array elements 10b, also referred to as "figure-of-eight" hybrid antenna array elements 10b, correspond to figure-of-eight DF signals 11 which may be expressed as:

$$\psi_{NS}(t)=\psi_N(t)-\psi_S(t)\approx 2iA(t)k\cdot L \sin \theta \quad (9.1)$$

$$\psi_{EW}(t)=\psi_E(t)-\psi_W(t)\approx 2iA(t)k\cdot L \sin \theta \quad (9.2)$$

$$\psi_{NESW}(t)=\psi_{NS}(t)+\psi_{EW}(t)\approx 2iA(t)k\cdot L(\sin \theta+\cos \theta) \quad (9.3)$$

$$\psi_{NWSE}(t)=\psi_{NS}(t)-\psi_{EW}(t)\approx 2iA(t)k\cdot L(\sin \theta-\cos \theta) \quad (9.4)$$

in which small angle approximations are used, i.e. k·L sin $\theta$<<1 and k·L cos $\theta$<<1 and the incident signal angle is taken with respect to the direction of the east E antenna. The signal combinations $\psi_{NS}$ and $\psi_{EW}$ are the same as those used in the Watson-Watt method (Equations 2 to 4), $\psi_{NESW}$ is the result of summing North $\psi_N$ and East $\psi_E$ antenna signals 7 and subtracting South $\psi_S$ and West $\psi_W$ antenna signals 7, and $\psi_{NWSE}$ is the result of summing North $\psi_N$ and West $\psi_W$ antenna signals 7 and subtracting South $\psi_S$ and East $\psi_E$ antenna signals 7. The respective power values corresponding to the figure-of-eight DF signals 11 may be expressed as:

$$P_{NS}=4A^2k^2L^2\sin^2\theta \quad (10.1)$$

$$P_{EW}=4A^2k^2L^2\cos^2\theta \quad (10.2)$$

$$P_{NESW}=4A^2k^2L^2(1+\sin(2\theta)) \quad (10.3)$$

$$P_{NWSE}=4A^2k^2L^2(1-\sin(2\theta)) \quad (10.4)$$

in which the expressions for the power values of $P_{NESW}$ and $P_{NWSE}$ have been simplified using standard trigonometric identities. FIGS. 9a and 9b schematically illustrate the antenna gain patterns 22 corresponding to signal powers described by Equations 10.1 to 10.4. It will be appreciated that identical power values would be obtained using the negatives of the DF signals 11 of Equations 9.1 to 9.4. Thus, the N-S hybrid antenna array element 10b corresponds to an antenna gain pattern $22_{NS}$ which has the appearance of a figure-of-eight shape orientated along the north-south axis. Likewise, the antenna gain patterns $22_{EW}$, $22_{NESW}$, $22_{NWSE}$ of the other figure-of-eight hybrid antenna array elements 10b have lobes orientated along the east-west axis, the north east-south west axis and the north west-south east axis respectively. It will be appreciated that Equations 10.1 to 10.4 apply to the components of signal power at each given frequency included within the bandwidth of the DF spectra 16.

Figure 9C:
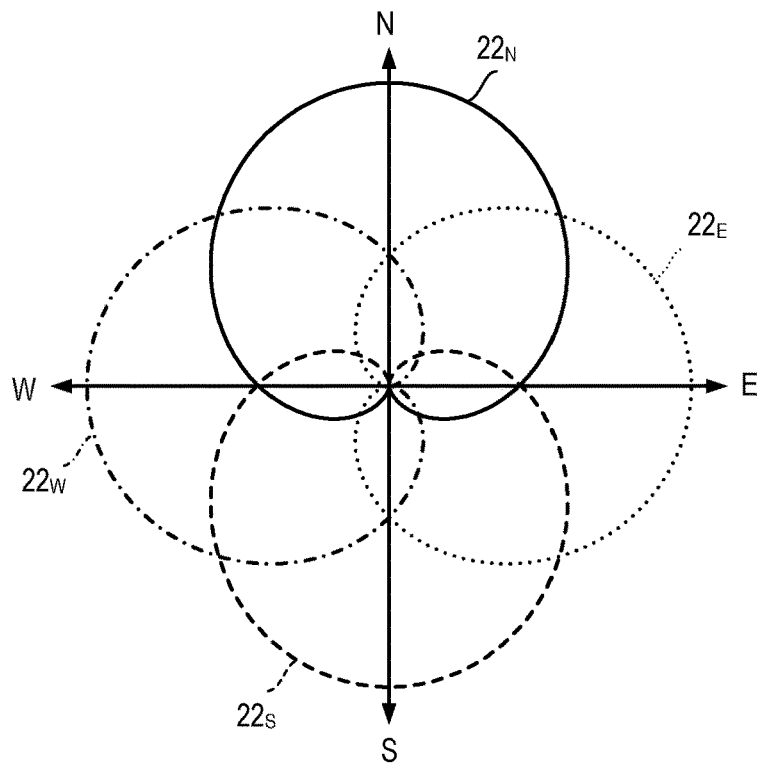
FIG. 9c schematically illustrates cardioid antenna gain patterns associated with direction finding signals obtained using a second group of hybrid antenna array elements with the second example of a direction finding system.
Figure 9D:
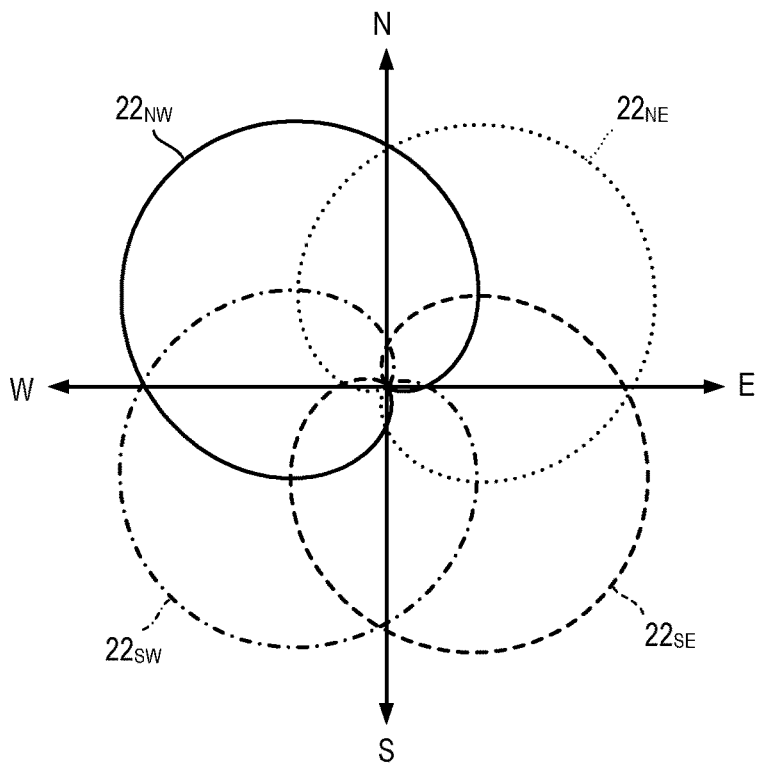
FIG. 9d schematically illustrates cardioid antenna gain patterns associated with direction finding signals obtained using a second group of hybrid antenna array elements with the second example of a direction finding system.

Referring also to FIGS. 9c and 9d, a second group of hybrid antenna array elements 10b are described. The second group of hybrid antenna array elements 10b, also referred to as "cardioid" hybrid antenna array elements 10b, correspond to cardioid DF signals 11 formed by adding or subtracting a multiple of the sense antenna 3 signal, $\psi_O=A(t)$ from each of the figure-of-eight DF signals. The second group of hybrid antenna array elements 10b includes eight cardioid DF signals which may be expressed as:

$$\Phi_N=\psi_{NS}+i\beta\psi_O \quad (11.1)$$

$$\Phi_S=\psi_{NS}-i\beta\psi_O \quad (11.2)$$

$$\Phi_E=\psi_{EW}+i\beta\psi_O \quad (11.3)$$

$$\Phi_W=\psi_{EW}-i\beta\psi_O \quad (11.4)$$

$$\Phi_{NE}=\psi_{NESW}+i\sqrt{2}\beta\psi_O \quad (11.5)$$

$$\Phi_{SW}=\psi_{NESW}-i\sqrt{2}\beta\psi_O \quad (11.5)$$

$$\Phi_{NW}=\psi_{NWSE}+i\sqrt{2}\beta\psi_O \quad (11.5)$$

$$\Phi_{SE}=\psi_{NWSE}-i\sqrt{2}\beta\psi_O \quad (11.5)$$

in which $\beta$ is a scalar. The additional factor of the square root of two in Equations 11.5 to 11.8 is included because the "diagonal" cardioid DF signals $\Phi_{NE}$, $\Phi_{SW}$, $\Phi_{NW}$, $\Phi_{SE}$ are larger by a factor of the square root of two. FIGS. 9c and 9d schematically illustrate the antenna gain patterns 22 corresponding to signal powers described by Equations 11.1 to 11.8. When the value of the scalar $\beta$ is chosen appropriately, $\Phi_N$ is a north cardioid DF signal 11, corresponding to a north cardioid hybrid antenna array element 10 and having a cancellation null in the south direction. Likewise $\Phi_S$ is a south cardioid DF signal 11 having a cancellation null in the north direction, $\Phi_{SW}$ is a south west cardioid DF signal 11 having a cancellation null in the north east direction and so forth. The value of $\beta$ required to precisely cancel one of the lobes of the respective base figure-of-eight DF signal 11 depends on the frequency of RF signal 2, i.e. the wave vector k and the baseline length L of the antenna array 8. For example, for the North cardioid DF signal:

$$\Phi_N=2iA(t)k\cdot L \sin \theta+i\beta\cdot A(t) \quad (12)$$

if the scalar $\beta$ is chosen so that $\beta=2k\cdot L$, then the corresponding power value will be:

$$P_N=4A^2k^2L^2(\sin \theta+1)^2 \quad (13)$$

Referring also to FIG. 9c, Equation 13 shows that the power $P_N$ of the north cardioid DF signal $\Phi_N$ is zero when $\theta=3\pi/2$, corresponding to the south direction. Of course, the reference direction chosen, east in this example, may be arbitrarily chosen, and the cancellation null would still lie in the direction of the south antenna. The north cardioid hybrid antenna array element 10b therefore corresponds to a cardioid antenna gain pattern $22_N$. The other seven cardioid hybrid antenna array elements 10b included in the second group have similar shaped cardioid antenna gain patterns $22_S$, $22_E$, $22_W$, $22_{NE}$, $22_{NW}$, $22_{SE}$, $22_{SW}$, with respective lobes orientated in south, east, west, north east, north west, south east and south west directions. It should again be noted that although the directions have been termed north, south, east and west, these directions refer to the antennae 9 which form the antenna array 8, and there is no requirement that the antennae be aligned with actual compass directions.

Figure 10A:
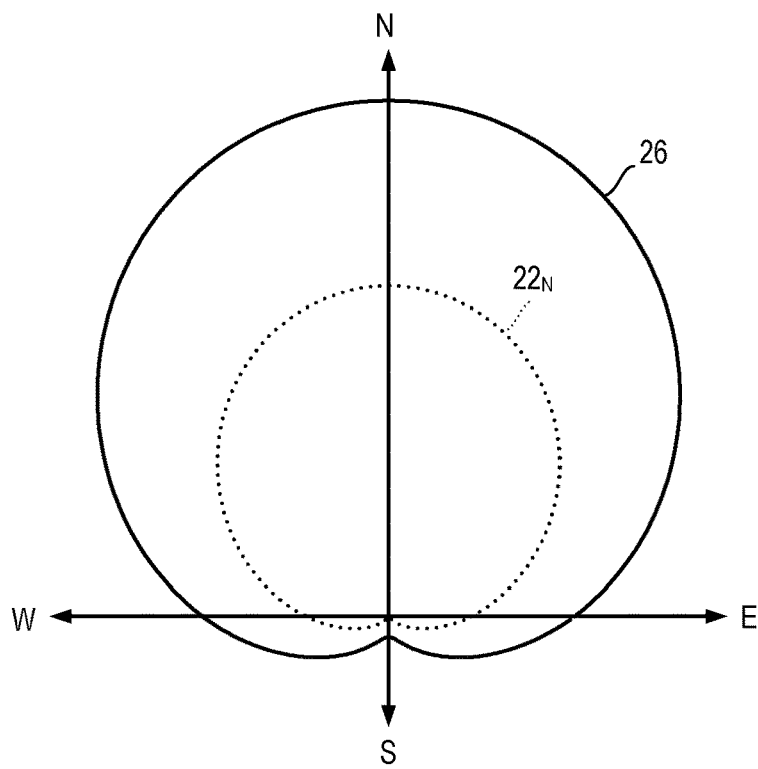
FIG. 10a schematically illustrates the effects of under compensation in generating the cardioid antenna gain patterns shown in FIGS. 9c and 9d.
Figure 10B:
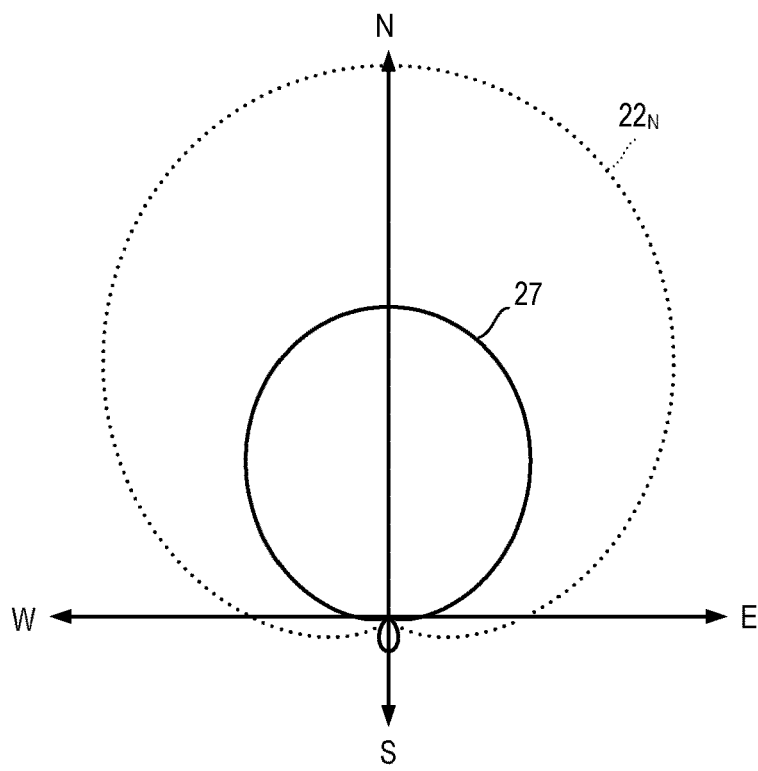
FIG. 10b schematically illustrates the effects of over compensation in generating the cardioid antenna gain patterns shown in FIGS. 9c and 9d.

Referring also to FIGS. 10a and 10b, the effect of using an imprecise value of the scalar $\beta$ will be described. If the value of $\beta$ is relatively larger than needed for precise cancellation of one lobe, i.e. $\beta>2k \cdot L$, the hybrid antenna array element 10b will correspond to an overcompensated cardioid gain pattern 26. The overcompensated cardioid antenna gain pattern 26 retains a minimum in the respective cardioid null direction, and each particular gain value corresponds to only two angles. FIG. 10a shows a comparison of the north cardioid antenna gain pattern $22_N$ with an overcompensated cardioid gain pattern 26 corresponding approximately to a value of $\beta=3k \cdot L$. However, if the value of $\beta$ is relatively smaller than that needed for precise cancellation of one lobe, i.e. $\beta<2k \cdot L$, the hybrid antenna array element 10b will correspond to an undercompensated cardioid antenna gain pattern 27. The undercompensated cardioid antenna gain pattern 27 has a smaller lobe orientated along the cardioid null direction, and some gain values will correspond to four incident angles. FIG. 10b shows a comparison of the north cardioid antenna gain pattern $22_N$ with an undercompensated cardioid antenna gain pattern 27 corresponding approximately to $\beta=k \cdot L$.

The methods described hereinafter of direction finding using power values are applied to DF spectra 16 having a bandwidth $\Delta f$ centred at a central frequency $f_c$. There are several ways that the under/over compensation of the cardioid antenna gain patterns 22 can be addressed when the second DF system 4b is used. In some methods, if the ratio of bandwidth to central frequency $\Delta f/f_c$ is low, for example less than one, then the effects of under/over compensation on the cardioid antenna gain pattern 22 may be small enough to ignore when a single constant value of $\beta$ optimised for the central frequency $f_c$ is used. Thus, in the case that the second type of DF system 4b is swept across a wide frequency range to obtain multiple DF spectra 16 centred at successively increasing (or decreasing) central frequencies $f_c$, a different value of $\beta$ is used in the analogue RF circuits of the DF signal obtaining module 12 depending on the value of the central frequency $f_c$. In general $\beta$ is proportional to the wave-vector/frequency, and approximately $\beta=2k \cdot L=4\pi \cdot f_c \cdot L/c$ in which c is the speed of light. In practice, the precise value of $\beta$ used at each central frequency $f_c$ differs from the ideal theoretical values to some degree, and measured values of $\beta$ determined during calibration of the second DF system 4b are used instead. In general, calibrated values of $\beta$ may varying about the theoretical value as $\beta=\alpha \times 4\pi \cdot f_c \cdot L/c$, in which $\alpha$ may be $0.1 \leq \alpha \leq 10$ or $0.5 \leq \alpha \leq 1.5$.

Alternatively, instead of optimising $\beta$ for the central frequency $f_c$, a constant value of $\beta$ may be chosen which is optimised for the highest frequency in each respective bandwidth $\Delta f$, i.e. the largest value of k. In this case, the cardioid antenna gain patterns 22 will be overcompensated across the rest of the bandwidth $\Delta f$, i.e. for the lower frequencies, thus avoiding the secondary lobes which can occur in an undercompensated cardioid antenna gain pattern 27.

Alternatively, a different value of $\beta$ may be applied for each frequency included in the bandwidth $\Delta f$ which is obtained about each central frequency $f_c$. For example, by convolving the sense antenna signal $\psi_O$ with an appropriate transfer function, such that each frequency is multiplied by the appropriate value of $\beta$. This may be achieved by passing the signals through a filter with an appropriate transfer function.

Figure 11:
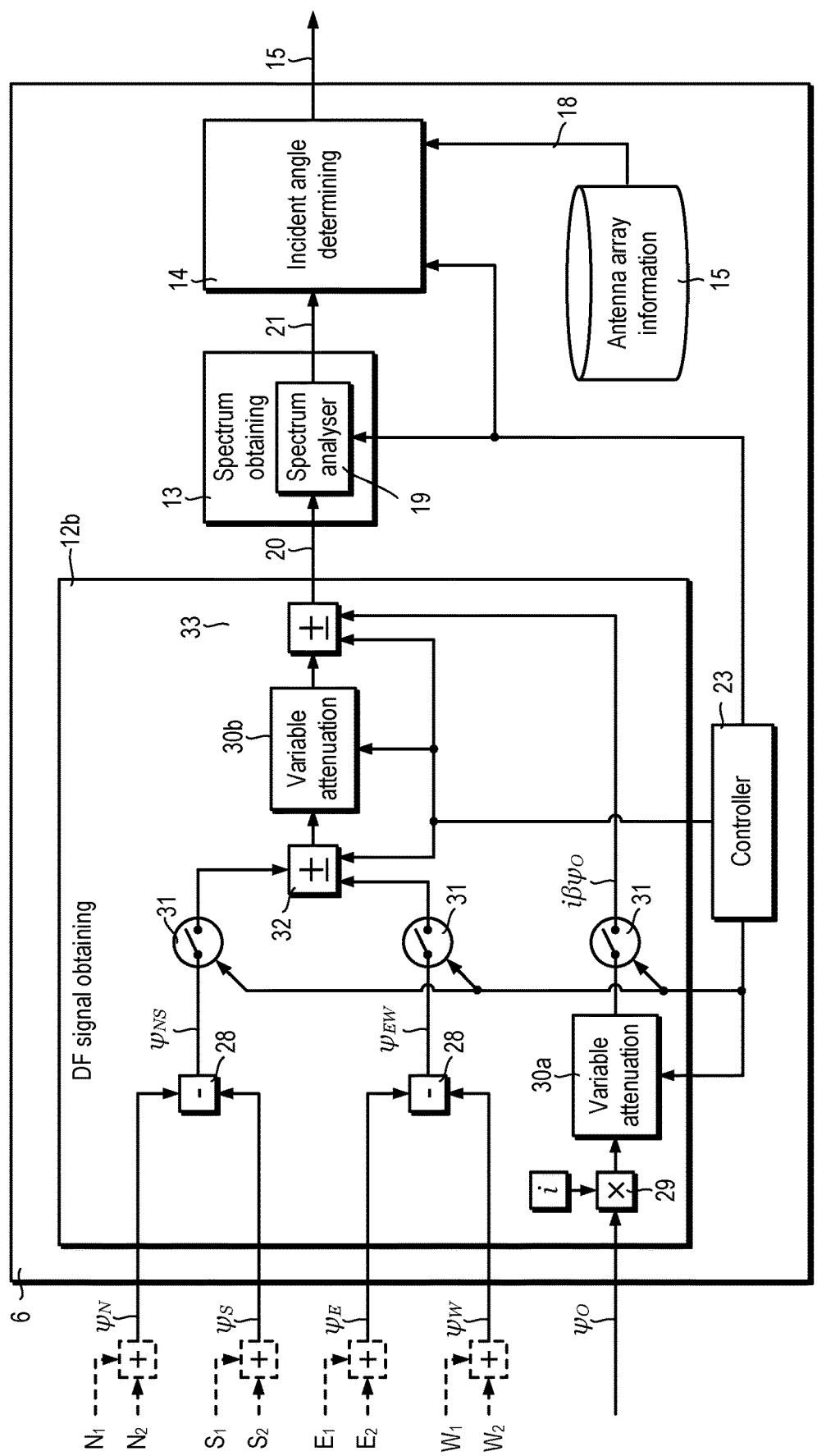
FIG. 11 is a schematic block diagram of a direction finding module configured for use with the second type of direction finding system.

Referring to FIG. 11, an example of a DF signal obtaining module 12b, configured for use in the second DF system 4b will be explained. Respective difference modules 28 obtain the north-south and east-west figure-of-eight DF signals $\psi_{NS}$ and $\psi_{EW}$. A phase shift module 29 applies a $\pi/2$ radian (90 degree) phase shift to the sense antenna signal $\psi_O$, i.e. $i\psi_O$ is shifted to $\psi_O$. A first variable attenuation module 30a applies amplitude adjustments to the phase shifted sense antenna signal $i\psi_O$.

The north-south $\psi_{NS}$, east-west $\psi_{EW}$ and adjusted sense antenna $i\psi_O$ signals can be switched on and off by an array of switches 31. A first sum/difference module 32 receives the north-south signal $\psi_{NS}$, the east-west signal $\psi_{EW}$ or both, dependent on the status of the array of switches 31. Depending on the inputs, and whether the operation performed is addition or subtraction, the first sum/difference module 32 may output any one of the four figure-of-eight DF signals 11.

A second variable attenuation module 30b applies amplitude adjustments to the output of the first sum or difference module 32. The effect of the first and second variable attenuation modules 30a, 30b in combination is to apply the amplitude adjustment factor $\beta$ to the sense antenna signal $\psi_O$ relative to the output of the first sum or difference module 32. Using two variable attenuation modules 30a, 30b allows either $\beta<1$ by attenuating the sense antenna signal $\psi_O$, or $\beta>1$ by attenuating the output of the first sum or difference module 32. As hereinbefore explained, the variable attenuation modules 30a, 30b may simply multiply the phase shifted sense antenna signal $i\psi_O$ and/or the output of the first sum or difference module 32 by a constant scalar, or the variable attenuation modules 30a, 30b may apply an amplitude adjustment function which multiplies each frequency component of the sense antenna signal $i\psi_O$ and/or the output of the first sum or difference module 32 by a frequency dependent scalar. The first and second variable attenuation modules 30a, 30b may also modify the values of attenuation to take account of the additional factor of the square root of two in Equations 11.5 to 11.8.

A second sum or difference module 33 receives the output of the first sum or difference module 32 and/or the adjusted sense antenna signal $i\beta\psi_O$. Dependent on the inputs and on whether the operation performed is addition or subtraction, the second sum/difference module 33 may output any one of the four figure-of-eight DF signals 11 or any one of the eight cardioid DF signals 11. The state of the array of switches 31 and the operation performed by each the first and second sum or difference modules 32, 33 is controlled by the controller 23. The controller 23 also coordinates the spectrum obtaining module 13 and the incident angle determining module 14.

The DF signal obtaining module 12b generates each DF signal 11 successively, and sends the DF signal sequence 20 to the spectrum obtaining module 13. Alternatively, the DF signal obtaining module 12b could include signal splitters (not shown) and produce some or all of the figure-of-eight and/or cardioid DF signals 11 simultaneously. The north $\psi_N$, south $\psi_S$, east $\psi_E$ and west $\psi_W$ antenna signals may be received from individual monopole or dipole antennae 9, or from summed pairs of monopole or dipole antennae. It will be apparent that the DF signal obtaining module 12b configured for use in the second DF system 4b provides a beam-forming network (BFN). In this example, the DF signal obtaining module 12b configured for use in the second DF system 4b is provided by analogue RF circuitry which may be digitally controlled by a FPGA or a microcontroller (e.g. controller 23). However, the DF signal obtaining module 12b configured for use in the second DF system 4b need not be provided by analogue RF circuitry. Alternatively, the DF signal obtaining module 12 may be digitally implemented using multiple, synchronised, analogue to digital converters combined with a field programmable gate array (FPGA) or a suitably programmed computer to perform the subsequent signal processing.

First Method of Calculating Incident Signal Angles

A first method of calculating incident signal angles using measured power values uses a number N, of DF signals 11, each which corresponds to an antenna array element 10 having a directional antenna gain pattern 22 having an associated direction vector V. For example, the direction vector V associated with each DF signal 11 may correspond to a maximum of the respective antenna gain pattern 22.

The first method is equally applicable to both the first (FIGS. 6a, 6b) and second (FIGS. 8a, 8b) types of DF system 4a, 4b. For example, if the first type of DF system 4a is used, then each of the N DF signals 11 can be based on an antenna signal 7 received from a physical antenna array element 10a which is a directional antenna having an associated direction vector V. If the second type of DF system 4b is used, then the each of the N DF signals 11 can be a cardioid DF signal based on a hybrid cardioid antenna array element 10b. For example, the cardioid DF signals 11 described earlier could be used, so that N=8 and the corresponding direction vectors V are orientated in north, north east, east, south east, south, south west, west and north west directions. Any antenna array 8 can be used for the first method, provided that the individual antennae 9, or linear combinations thereof forming hybrid antenna array elements 10b, have antenna gain patterns 22 which can be assigned a meaningful and sufficiently distinctive direction vector V.

In the following description, the measured power values of the $n^{th}$ DF spectrum $16_n$ shall interchangeably be referred to with the notation $P_n(f_k)$, in which $1 \le n \le N$, $f_k$ is the $k^{th}$ given frequency of a total of K frequencies such that $1 \le k \le K$ and the bandwidth $\Delta f = f_K - f_1$.

The first method will be explained in further detail with reference to the process flow diagram shown in FIG. 12.

The DF signal obtaining module 12 receives the antenna signals $7_1, \ldots, 7_R$ and generates the corresponding DF signals $11_1, \ldots, 11_N$ based on the antenna array elements 10 (step S1201). If the antenna array elements 10 are physical antenna array elements 10a, the numbers of antenna signals 7 and DF signals 11 will be equal, i.e. N=R. The spectrum obtaining module 9 receives the DF signals $11_1 \ldots 11_N$ and generates the corresponding DF spectra $16_1 \ldots 16_N$ (step S1202). As explained hereinbefore, the DF signals 11 and DF spectra 16 may be generated either simultaneously or sequentially.

The subsequent processes are carried out for each given frequency $f_k$, starting with the lowest frequency $f_1$ which is included in the bandwidth $\Delta f$ of the DF spectra $16_1, \ldots, 16_N$ (step S1203).

The incident angle determining module 14 selects a subset of M selected DF spectra $34_1, \ldots, 34_M$, where the number, M, of selected DF spectra 34 can be greater than or equal to 2 and less than or equal to N, i.e. $2 \le M \le N$ (step S1204). The incident angle determining module 14 may select the subset of M selected DF spectra $34_1, \ldots, 34_M$ which have the highest measured signal powers $P_m(f_k)$ at the given frequency $f_k$, where $1 \le m \le M$.

The incident angle determining module 14 calculates a resultant vector $V_R(f_k)$ as a weighted sum of the direction vectors V corresponding to each selected DF spectrum $34_1 \ldots 34_M$, each direction vector V weighted by a monotonically increasing function F of the respective measured signal power values $P_m(f_k)$ at the given frequency $f_k$ (step S1205). For example, the resultant vector $V_R(f_k)$ may be calculated according to:

$$V_R(f_k) = \sum_{m=1}^{M} F(P_m(f_k)) \cdot V_m \quad (14)$$

in which $V_m$ is the direction vector V associated with the $m^{th}$ selected DF spectrum $34_m$ and F in general may be a monotonically increasing function of $P_m(f_k)$, for example, a square root or higher power. In general F may be of the form $F(P)=P^\sigma$ with $0 \le \sigma \le 1$. This allows the relative weighting of the most powerful signal to be varied. In the case that $\sigma=1$, the direction vectors $V_m$ are simply weighted by the respective power values $P_m(f_k)$. The incident signal angle $\theta_k$ for the given frequency $f_k$ is assigned based on the direction of the resultant vector $V_R(f_k)$. The incident angle determining module 14 refers the initially calculated incident signal angle $\theta_k$ to a calibration look-up table (not shown) stored in the antenna array information storage 15. The entry in the calibration look-up table corresponding to the initially calculated incident signal angle $\theta_k$ stores a correction factor determined during calibration of the DF system 4, which is applied to the initially calculated incident signal angle $\theta_k$ to remove systematic biases. For the first method of calculating incident signal angles, the antenna array information storage 15 supplies the direction vectors V to the incident angle determining module 14. Alternatively, the antenna array information storage 15 may supply the respective antenna gain patterns 22, and the incident angle determining module 14 may determine the direction vectors V based on the received antenna gain patterns 22. In the case that the respective antenna gain patterns 22 are not substantially the same up to a rotation, additional weighting coefficients may be used. The incident signal angle $\theta_k$ for the given frequency $f_k$ is stored to the incident signal angle data 17 (step 1206).

The incident angle determining module 14 checks whether an incident signal angle $\theta_k$ has been assigned for every given frequency $f_k$ included in the bandwidth of the DF spectra 16, i.e. whether k=K (step S1207). If an incident signal angle $\theta_k$ has been assigned for every given frequency $f_k$, then the first method is finished. If there are further frequencies $f_k$ for which an incident signal angle $\theta_k$ has not been assigned, the next given frequency, $f_{k+1}$, is selected (step S1208) and the incident angle determining module 14 selects a new subset of M selected DF spectra $34_1, \ldots, 34_M$ based on the measured signal power values for the next given frequency $P_n(f_{k+1})$ (step S1204).

In the first method of calculating incident signal angles, the incident angle determining module 14 may impose an additional requirement that the M selected DF spectra 34$_1$, ..., 34$_M$ should have adjacent direction vectors V. If respective direction vectors V of the M selected DF spectra 34$_1$, ..., 34$_M$ are not adjacent, then there is a possibility that the calculated incident signal angle $\theta_k$ could be affected by multi-path transmission, or by multiple signal sources 5 transmitting RF signals 2 at the same frequency $f_k$. If the M selected DF spectra 34$_1$, ..., 34$_M$ having the largest signals powers $P_m(f_k)$ are not adjacent, then the incident signal angle $\theta_k$ may still be calculated, and the incident signal angle data 17 can include additional information indicating whether the selected DF spectra 34$_1$, ..., 34$_M$ were adjacent or not, to indicate the possibility of multi-path or multi-source detection at that frequency $f_k$.

In the first method of calculating incident signal angles, instead of selecting a subset of M selected DF spectra 34, the incident angle determining module 14 may include all of the DF spectra 16 in the calculation of the resultant vector $V_R(f_k)$, i.e. M=N.

Using the first method, detailed knowledge of the antenna gain patterns 22 of the antenna array elements 10 is not needed, provided that the direction vectors V can be determined and/or inferred, i.e. the direction of maximum gain for each antenna array element 10.

Second Method of Calculating Incident Signal Angles

A second method of calculating incident signal angles using measured values of power uses a similar DF system 4 (FIG. 2) to the first method, with one additional consideration. The second method assumes that antenna array elements 10 correspond to Gaussian antenna gain patterns 22 (FIG. 7). For example, the second method may be used with the first type of DF system 4*a* (FIGS. 6*a*, 6*b*) in the case that the directional antennae 24 which comprise the physical antenna array elements 10*a* of the first DF system 4*a* are antennae having Gaussian antenna array gain patterns 22.

The second method will be explained in further detail with reference to the process flow diagram shown in FIG. 13.

Figure 12:
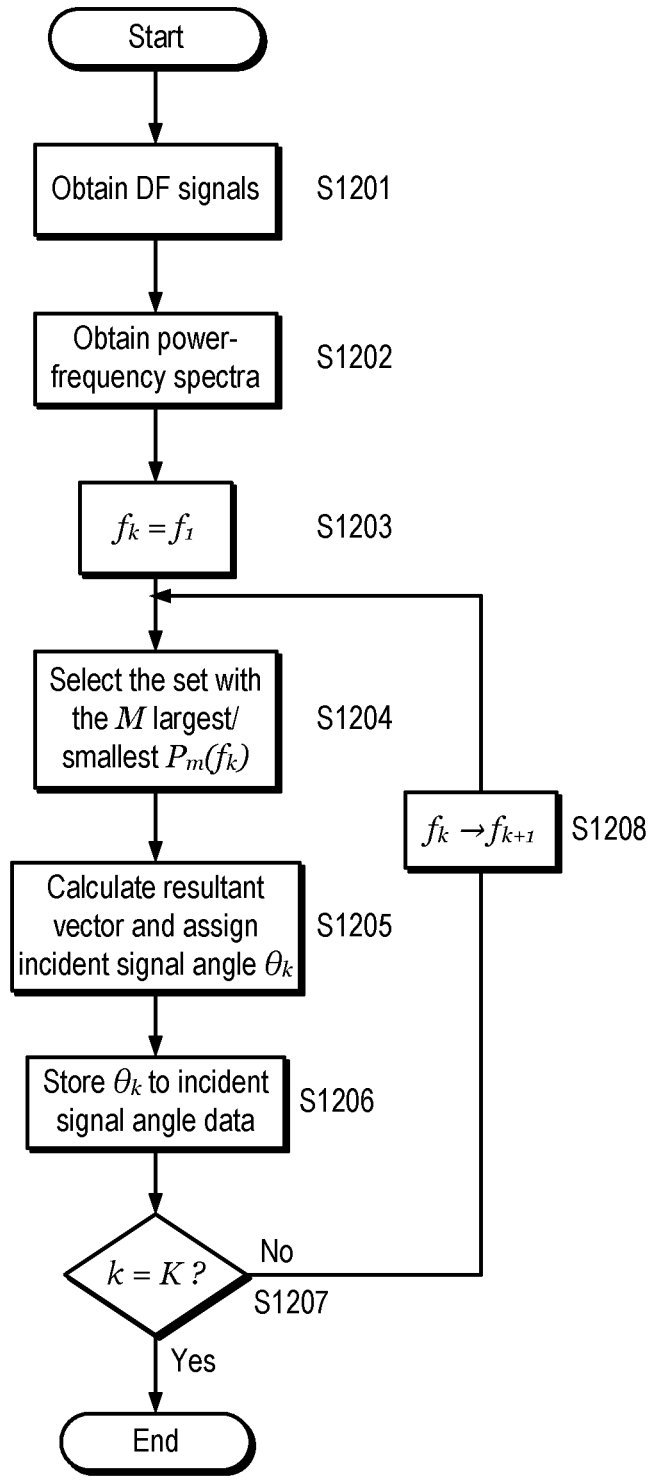
FIG. 12 is a process flow diagram for a first method of direction finding using measured values of signal powers.
Figure 13:
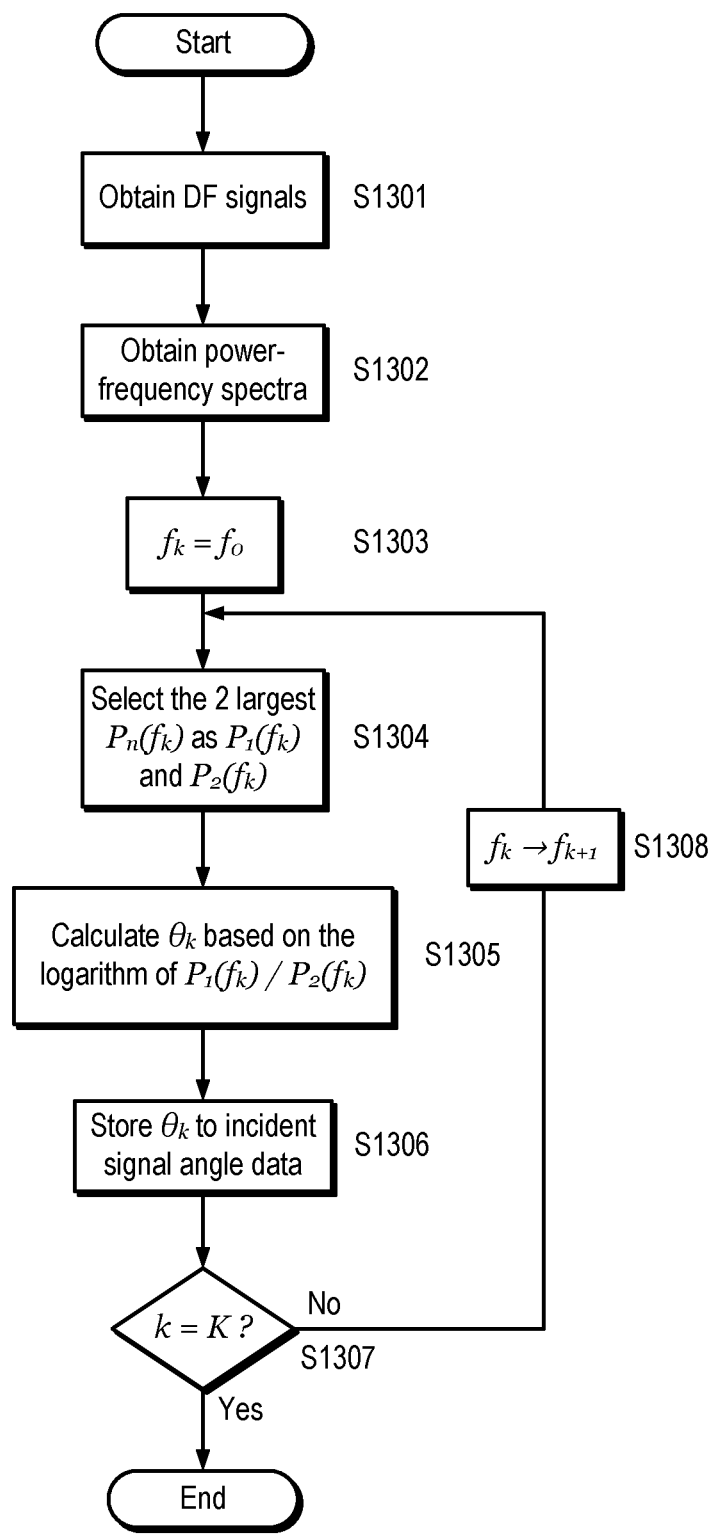
FIG. 13 is a process flow diagram for a second method of direction finding using measured values of signal powers.

Referring to FIGS. 12 and 13, the second method is similar to the first method up to the processing conducted by the incident angle determining module 14 (steps S1310 and S1302). The subsequent processes are carried out for each given frequency $f_k$, starting with the lowest frequency $f_1$ which is included in the bandwidth corresponding to the plurality of DF spectra 16$_1$, ..., 16$_N$ (step S1303).

The incident angle determining module 14 selects first and second selected DF spectra 34$_1$, 34$_2$ which have the two largest values of signal power $P_1(f_k)$, $P_2(f_k)$ for the given frequency $f_k$ (step S1304). The incident angle determining module 14 requires the first and second selected DF spectra 34$_1$, 34$_2$ to correspond to adjacent antenna array elements 10 (in terms of the direction vectors $V_1$, $V_2$). If the respective first and second antenna array elements 10 are not adjacent, then there is a possibility that the calculated incident signal angle $\theta_k$ may be affected by multi-path transmission, or multiple signal sources 3 transmitting at the same given frequency $f_k$.

The incident angle determining module 14 calculates the incident signal angle $\theta_k$ for the given frequency $f_k$ relative to the midpoint of the first and second angles $\theta_1$, $\theta_2$ corresponding to the respective first and second direction vectors $V_1$, $V_2$ of the first and second selected DF spectra 34$_1$, 34$_2$ (step S1305). The angular deviation from the midpoint of the first and second angles $\theta_1$, $\theta_2$ is calculated by multiplying a DF slope 35 by the base ten logarithm of the ratio of the measured signal powers $P_1(f_k)$, $P_2(f_k)$ of the first and second selected DF spectra 34$_1$, 34$_2$. For example, the incident signal angle $\theta_k$ for the given frequency $f_k$ may be calculated according to:

$$\theta_k = \frac{\theta_1 + \theta_2}{2} + C_k \cdot \log_{10}\left(\frac{P_1(f_k)}{P_2(f_k)}\right) \qquad (15)$$

in which $\theta_1$ is the incident angle parallel to the first direction vector $V_1$ corresponding to the antenna array element 10 providing the first selected DF spectrum 34$_1$, $\theta_2$ is the incident angle parallel to the second direction vector $V_2$ corresponding to the antenna array element 10 providing the second selected DF spectrum 34$_2$ and $C_k$ is a DF slope 35 corresponding to the given frequency $f_k$. The incident angle determining module 14 refers the initially calculated incident signal angle $\theta_k$ to a calibration look-up table (not shown) stored in the antenna array information storage 15. The entry in the calibration look-up table corresponding to the initially calculated incident signal angle $\theta_k$ stores a correction factor determined during calibration of the DF system 4, which is applied to the initially calculated incident signal angle $\theta_k$ to remove systematic biases. For the second method of calculating incident signal angles, the antenna array information storage 15 supplies the first and second direction vectors $V_1$, $V_2$ and the DF slope 35 to the incident angle determining module 14. The DF slope 35 may be the same for all given frequencies $f_k$, such that the value of $C_k$ is the same for all values of k. However, in general the DF slope 35 may be expected to depend on the given frequency $f_k$, such that the value of $C_k$ varies with the frequency $f_k$. The incident signal angle $\theta_k$ for the given frequency $f_k$ is stored to the incident signal angle data 17 (step 1306).

The incident angle determining module 14 checks whether an incident signal angle $\theta_k$ has been assigned for every given frequency $f_k$ included in the bandwidth of the DF spectra 16, i.e. whether k=K (step S1307). If an incident signal angle $\theta_k$ has been assigned for every given frequency $f_k$, then the method is finished. If there are further given frequencies $f_k$ which have not yet been assigned an incident signal angle $\theta_k$, the next given frequency, $f_{k+1}$, is selected (step S1308) and the incident angle determining module selects new first and second selected DF spectra 34$_1$, 34$_2$ based on the measured signal power values $P_1(f_{k+1})$, $P_2(f_{k+1})$ for the next given frequency (step S1304).

The second method is preferably used in a DF system 4 which includes directional antennae 24 having Gaussian antenna gain patterns 22, as Equation 7. For example, the first type DF system 4*a* when the directional antennae have Gaussian antenna gain patterns. The calculation need not use base ten logarithms, and it will be apparent that any base of logarithm may be used with appropriate adjustments of the values of the DF slope(s) $C_k$.

However, the second method need not be exclusively used with antenna array elements 10 which have Gaussian directional gain patterns 22, and the antenna array elements need not be physical antenna array elements 10*a*. The second method can be used with a DF system 4 which does not use antenna array elements 10 having Gaussian antenna gain patterns 22, however, there will be bias errors which must be calibrated and corrected for. For example, using the second type of DF system 4*b* with cardioid hybrid antenna array elements 10*b* would involve making additional corrections to the incident signal angles $\theta_k$ calculated using the second method. Such additional corrections may be readily calibrated during testing and calibration of the second type DF system 4b.

Third Method of Calculating Incident Signal Angles

A third example of a method of calculating incident signal angles using measured values of signal power is applicable to DF systems 4 (FIG. 2) which use antenna array elements 10 having directionally dependent antenna gain patterns 22. The third method can be applied to DF systems 4 which use physical antenna array elements 10a, for example, the first type of DF system 4a (FIGS. 6a, 6b). The third method is equally applicable to DF systems 4 which use hybrid antenna array elements 10b, for example, the second type of DF system 4b (FIGS. 8a, 8b) using some or all of the figure-of eight and cardioid DF signals 11 described hereinbefore. Further requirements of a DF system 4 suitable for use with the third method shall be apparent from the more detailed discussion of the method which follows hereinafter.

The third method will be explained in further detail with reference to the process flow diagram shown in FIG. 14.

Figure 14:
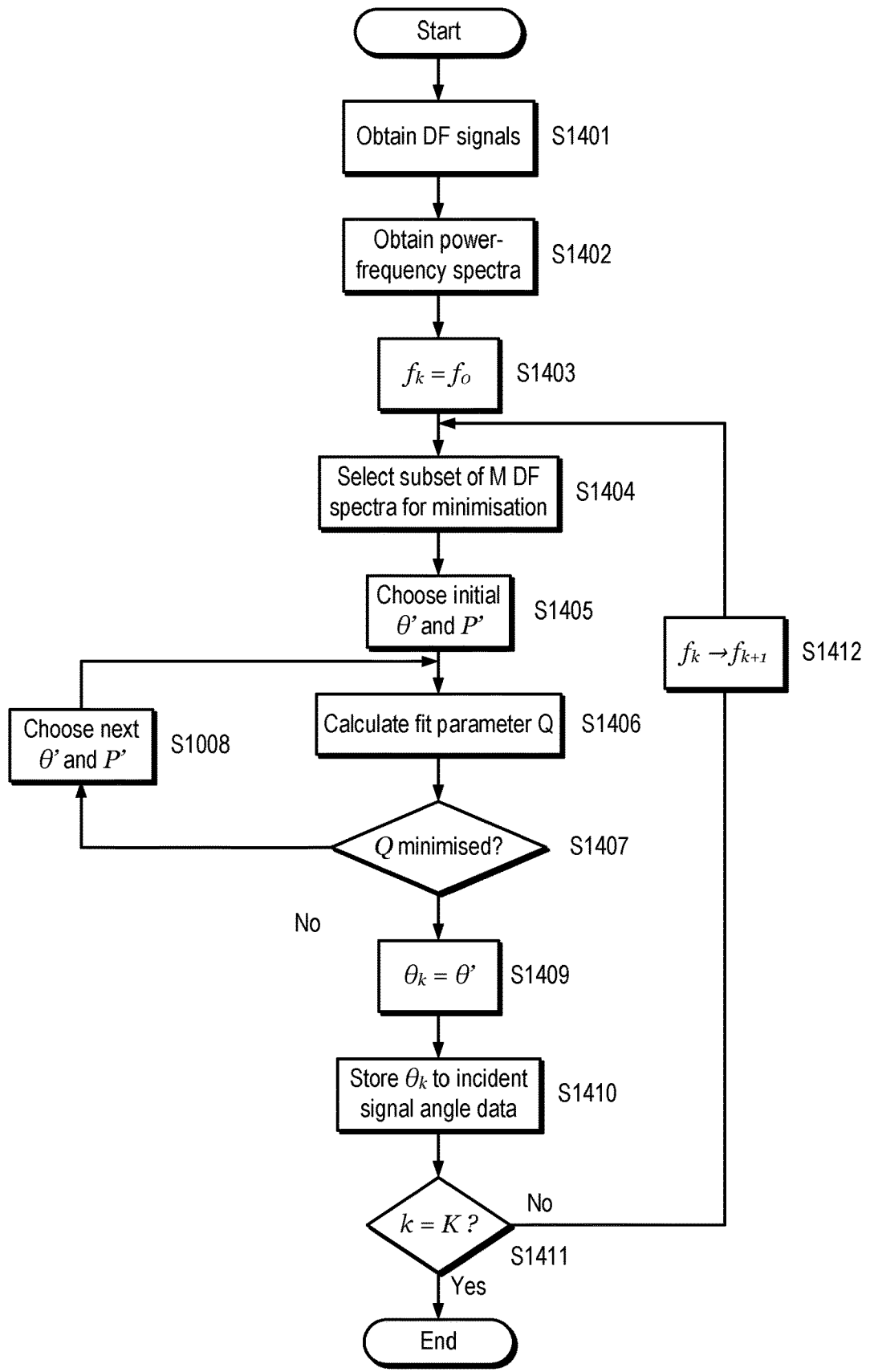
FIG. 14 is a process flow diagram for a third method of direction finding using measured values of signal powers.

Referring to FIGS. 12 to 14, the third method is similar to the first and second methods up to the incident angle determining module 14, and the DF signal obtaining module 12 obtains a total of N DF signals 11 and the corresponding DF spectra 16 (steps S1401 and S1402). The subsequent processes are carried out for each given frequency $f_k$, starting with the lowest frequency $f_1$ which is included in the bandwidth $\Delta f$ corresponding to the plurality of DF spectra $16_1, \ldots, 16_N$ (step S1403).

The incident angle determining module 14 selects a subset of M selected DF spectra $34_1, \ldots, 34_M$ which is sufficient to uniquely determine an incident signal angle $\theta_k$ (step S1404). A DF spectrum 16 corresponding to the antenna signal 7 from an omnidirectional antenna 25 may be included in the set of M selected DF spectra $34_1, \ldots, 34_M$. The condition for a subset of M selected DF spectra $34_1, \ldots, 34_M$ to be sufficient to uniquely determine an incident signal angle $\theta_k$ at a given frequency $f_k$ is that the corresponding set of antenna gain patterns 22 have a distinct combination of gain values for any incident signal angle $\theta$. An example of a sufficient set is described hereinafter with reference to FIG. 15.

The incident angle determining module 14 begins calculating the incident signal angle $\theta_k$ for the given frequency $f_k$ using a least squares minimisation method. The incident angle determining module 14 selects initial values for parameters of assumed signal angle $\theta'$ and assumed signal power P' (step S1405).

The incident angle determining module 14 calculates a fit parameter Q, which is based on the sum of the squared differences between the measured values of signal power $P_1(f_k) \ldots P_M(f_k)$ and respective estimated values of signal power $W_1, \ldots, W_M$ (step S1406). Each estimated values of signal power $W_1, \ldots, W_M$ is calculated using the assumed signal angle $\theta'$, the assumed signal power P' and the respective antenna gain patterns 22 received from the antenna array information storage 15. In general, an antenna gain pattern 22 may be a function of the given frequency $f_k$. However, the antenna gain patterns 22 may be assumed to be constant in the case that the DF spectra 16 span a frequency bandwidth $\Delta f$ over which the antenna gain patterns 22 do not vary significantly, for example, less than 10% or less than 1% variation. For example, the fit parameter Q may be calculated according to:

$$Q = \sum_{m=1}^{M} (P_m(f_k) - W_m(f_k, \theta', P'))^2 \quad (16)$$

in Equation 16, Q is the fit parameter, $P_m(f_k)$ is the measured signal power at the given frequency $f_k$ for the $m^{th}$ of M selected DF spectra $34_1, \ldots, 34_M$, $W_n(f_k,\theta',P')$ is the respective estimated signal power calculated based on the assumed signal angle $\theta'$, the assumed signal power P' and the respective antenna gain pattern 22 of the $m^{th}$ antenna array element 10.

The incident signal angle determining module 14 determines whether the fit parameter Q is a minimum value (step S1407). In the case that the fit parameter Q is minimised, then the assumed signal angle $\theta'$ corresponding to the minimised fit parameter Q is assigned as the incident signal angle $\theta_k$ for the given frequency $f_k$ (S1409). The incident angle determining module 14 refers the initially calculated incident signal angle $\theta_k$ to a calibration look-up table (not shown) stored in the antenna array information storage 15. The entry in the calibration look-up table corresponding to the initially calculated incident signal angle $\theta_k$ stores a correction factor determined during calibration of the DF system 4, which is applied to the initially calculated incident signal angle $\theta_k$ to remove systematic biases. The incident signal angle $\theta_k$ for the given frequency $f_k$ is stored to the incident signal angle data 17 (step 1410). In the case that the fit parameter Q is not minimised, the incident signal angle determining module 14 updates the assumed signal angle $\theta'$ and/or assumed signal power P' to new values (step S1408) and re-calculates the fit parameter Q (step S1406). The determination of whether the fit parameter Q is minimised can be based on whether the change in the fit parameter Q between the present and preceding values of assumed signal angle $\theta'$ and assumed signal power P' is less than a threshold level. Alternatively, the incident signal angle determining module 14 may calculate the fit parameter Q using a range of assumed signal angles $\theta'$ and assumed signal powers P', followed by selection of the combination which minimises the fit parameter Q. The particular method of iterating the values of the assumed signal angle $\theta'$ and the assumed signal power P', and the criteria for determining convergence of the fit parameter Q, may be performed according to any least squares minimisation algorithm.

The incident signal determining module 14 checks whether an incident signal angle $\theta_k$ has been assigned for every given frequency $f_k$ included in the bandwidth of the DF spectra 16, i.e. whether k=K (step S1411). If an incident signal angle $\theta_k$ has been assigned for every given frequency $f_k$, the method is finished. If there are further given frequencies $f_k$ which have not yet been assigned an incident signal angle $\theta_k$, the next given frequency, $f_{k+1}$, is selected (step S1412) and the incident signal determining module 14 selects a subset of M selected DF spectra $34_1, \ldots, 34_M$ which is sufficient to uniquely determine an incident signal angle $\theta_{k+1}$ for the next given frequency $f_{k+1}$ (step S1404).

Figure 15:
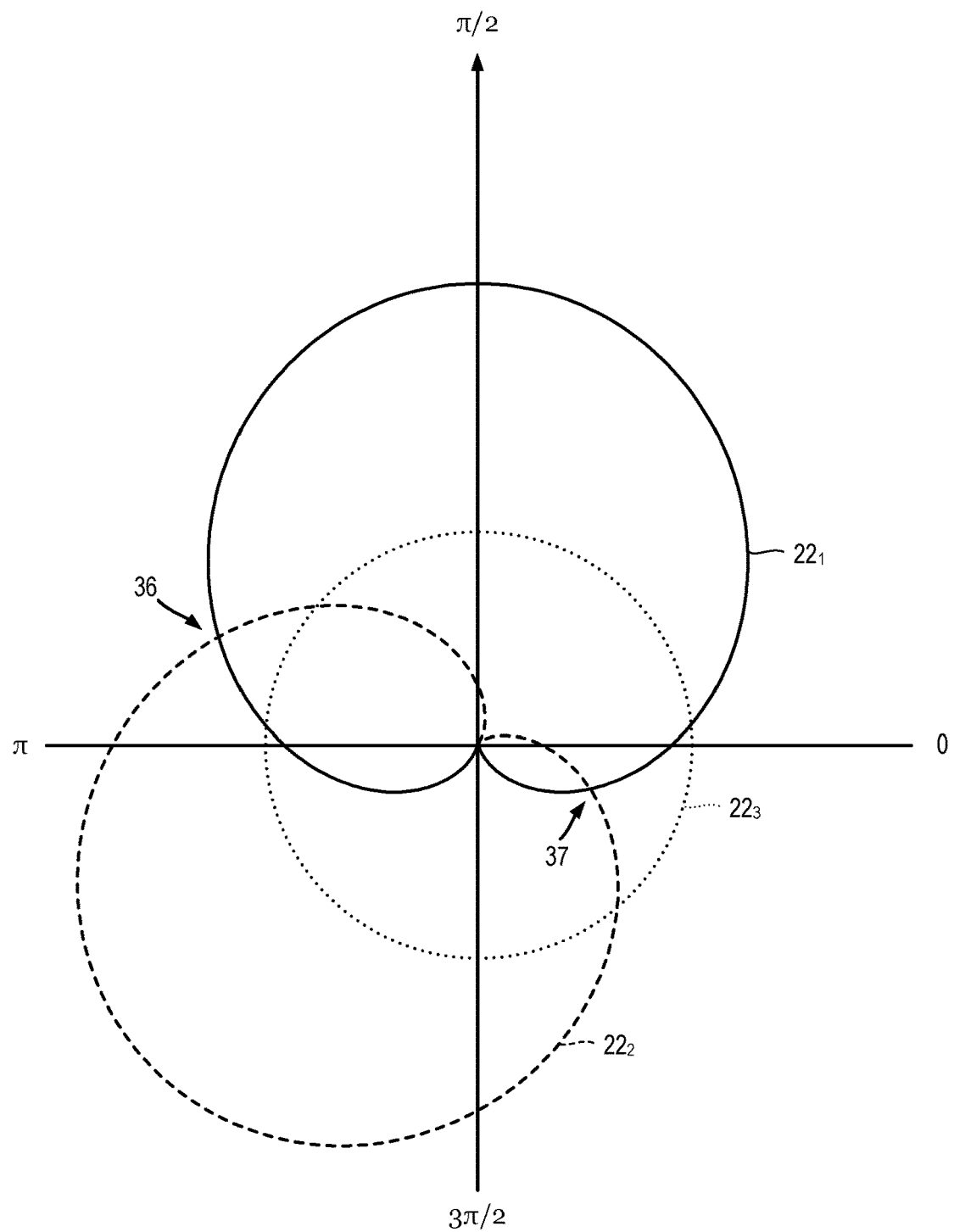
FIG. 15 schematically illustrates a set of antenna gain patterns corresponding to a respective set of direction finding signals suitable for use with the third method of direction finding.

FIG. 15 shows examples of antenna gain patterns $22_1$, $22_2$, $22_3$ corresponding to a subset of selected DF spectra $34_1, \ldots, 34_M$ which is sufficient to uniquely determine an incident signal angle.

Referring also to FIG. 15, selecting a subset of M selected DF spectra $34_1, \ldots, 34_M$ according to the third method will be explained in further detail. First and second selected DF spectra $34_1$, $34_2$ correspond to a pair of antenna array elements 10 having respective first and second directionally dependent antenna gain patterns $22_1$, $22_2$. A third selected DF spectrum $34d3$ corresponds to an antenna array element 10 which is simply an omnidirectional antenna 25, and which has a respective omnidirectional (i.e. in-plane isotropic) antenna gain pattern $22_3$. In this example, each of the directional antenna gain patterns $22_1$, $22_2$ has a mirror symmetry axis which coincides with the respective direction vector V. For example, if the third method was used with the first type of DF system $4a$, a pair of the physical antenna array elements $10a$ provided by directional antennae 24 having Gaussian antenna gain patterns 22 may provide the first and second selected DF spectra $34_1$, $34_2$. Alternatively, if the third method was used with the second type of DF system $4b$, a pair of cardioid hybrid antenna array elements $10b$ may provide the first and second selected DF spectra $34_1$, $34_2$ The antenna array elements 10 corresponding to the first and second selected DF spectra $34_1$, $34_2$ are orientated so that their direction vectors V, and the respective mirror symmetry axes of the respective antenna gain patterns $22_1$, $22_2$, are non-coincident. The first and second antenna gain patterns $22_1$, $22_2$ have a distinct combination of gain values at all angles except for a first signal angle 36 and a second signal angle 37, at which the first and second antenna gain patterns $22_1$, $22_2$ have equal values of antenna gain. The ambiguity can be resolved by including the third selected DF spectrum $34_3$, selected such that the respective third antenna gain pattern $22_3$ does not have the same value of gain as the first and second antenna gain patterns at the first and second signal angles 36, 37.

In general, any subset of the DF spectra $16_1, \ldots, 16_N$ can be selected for the third method, provided that the subset of M selected DF spectra $34_1, \ldots, 34_M$ corresponds to a set of respective antenna gain patterns 22 which have a distinct set of gain values for each incident signal angle θ. In general, any DF system 4 may be used which can provide at least one set of antenna array elements 10 which have a distinct set of gain values for each incident signal angle θ.

The incident angle determining module 14 can select the subset of M selected DF spectra $34_1 \ldots 34_M$ as the subset having respective antenna gain patterns 22 which have a distinct set of gain values for each incident signal angle θ and additionally having the largest differences between the measured values of signal power $P_n(f_k)$ at the given frequency $f_k$. Selecting a sufficient subset of M selected DF spectra $34_1, \ldots, 34_M$ which is less than all of the DF spectra $16_1, \ldots, 16_N$, i.e. M<N, can help to minimise the computational cost of the least squares minimisation process (steps S1405 to S1409).

In practice, it is possible for the measured signal powers $P_n(f_k)$ to include contributions from noise signals which have amplitudes large enough that a theoretically sufficient subset of selected DF spectra $34_1, \ldots, 34_M$ does not in practice have a unique global minimum. In such a case, the incident angle determining module 14 can include further DF spectra 16, or all of the DF spectra $16_1, \ldots, 16_N$, into the definition of the fit parameter Q. The inclusion of further DF spectra 16 in the least squares minimisation process increases the robustness of the incident signal angle $θ_k$ calculated, when compared to only including a theoretically sufficient set of DF spectra 16. The increased robustness may be at the expense of increased computational costs.

The least squares minimisation process of the third method (steps S1405 to S1409) can be conducted using any known least squares minimisation method, or any other method suitable for determining the values of parameters which minimise a multi-parametric function. The incident signal angle data 17 may include information in addition to the values of incident signal angle $θ_k$ for each given frequency $f_k$. For example, the incident signal angle data 17 may include, for each given frequency $f_k$, the final value of the minimised fit parameter Q as a measure of the quality/confidence level of the calculated incident signal angle $θ_k$ at the given frequency $f_k$.

Example of Implementing the Third Method Using the Second Type of DF System $4b$ Referring to FIGS. $8a$, $8b$, $9a$, $9b$, $9c$, $9d$, 11, 14 and 15, a possible implementation of the third method using the second type of DF system $4b$ with the DF signal obtaining module $12b$ will be described in further detail.

A number of possible schemes may provide sufficient information for an unambiguous direction estimate using third method with the second DF system $4b$ (FIGS. $8a$, $8b$). In other words, there are a number of possible subsets of the earlier described hybrid figure-of-eight signals $\psi_{NS}$, $\psi_{EW}$, $\psi_{NESW}$, $\psi_{NWSE}$, the hybrid cardioid signals $\Phi_N$, $\Phi_S$, $\Phi E$, $\Phi_W$, $\Phi_{NE}$, $\Phi_{SW}$, $\Phi_{NW}$, $\Phi_{SE}$, and the sense antenna signal $\psi_O$, which may satisfy the condition that the respective set of antenna gain patterns 22 have a distinct combination of gain values for any incident signal angle θ (see also Equations 9.1 to 9.4 and 11.1 to 11.8).

As described hereinbefore, in practical circumstances, it may be desirable to include further DF signals 11 in addition to a subset which are mathematically sufficient to determine a unique incident signal angle θ. One example of such a subset includes the DF signals $\psi_O$, $\psi_{NS}$, $\psi_{EW}$, $\psi_{NESW}$, $\Phi_N$ and $\Phi_E$. It can be seen from FIG. 11 that by choosing the positions of the switches 31 in succession, this particular subset of DF signals 11 may be sequentially generated by the DF signal obtaining module $12b$. Based on the DF spectra 16 generated based on such DF signals 11, the measured values of power can be obtained for each given frequency $f_k$ included in the bandwidth Δf of the respective DF spectra 16, e.g. $P_O(f_k)$, $P_{NS}(f_k)$ etc.

No particular subset of DF signals 11 is required to be used, and other signal sets suitable for using the third method with the second type of DF system $4b$ can be readily determined using the criteria that the corresponding set of antenna gain patterns 22 should contain at least a subset of antenna gain patterns 22 having a unique combination of gain values for each incident signal angle. For example, the DF signal $\Phi_{NE}$ may be adjoined to the above described example subset, and/or some of the DF signals 11 formed by summing may be replaced or augmented by signal differences, for example, the North cardioid DF signal $\Phi_N$ may be replaced by the South cardioid DF signal $\Phi_S$.

Having selected an appropriate set of DF signals 11, the calculation of the incident signal angle $θ_k$ for each given frequency $f_k$ may proceed according to the hereinbefore described third method of calculating incident signal angles using power measurements.

The second type of DF system $4b$ may be configured at the time of manufacture to obtain a set of DF signals 11 (step S1401) which are suitable for the third method, and to use every resulting DF spectrum 16 in the mean squares minimisation procedure (steps S1404 to S1407). Alternatively, the second DF system may be configured to obtain an expanded set of DF signals 11, for example, the DF signals 11 corresponding to each of the hereinbefore described figure-of-eight and cardioid hybrid antenna array elements $10b$ (step S1401), and to select a potentially different subset of the resulting DF spectra 16 for use in the mean squares minimisation calculation (steps S1404 to S1407) at each given frequency $f_k$.

Fourth Method of Calculating Incident Signal Angles

A fourth method of calculating incident signal angles is suitable for use with the second type of DF system 4b (FIGS. 8a, 8b). The fourth method uses at least one pair of hybrid figure-of-eight antenna array elements 10b and the eight hybrid cardioid antenna array elements 10b described earlier. The fourth method is explained with reference to the process flow diagram shown in FIG. 16.

Figure 16:
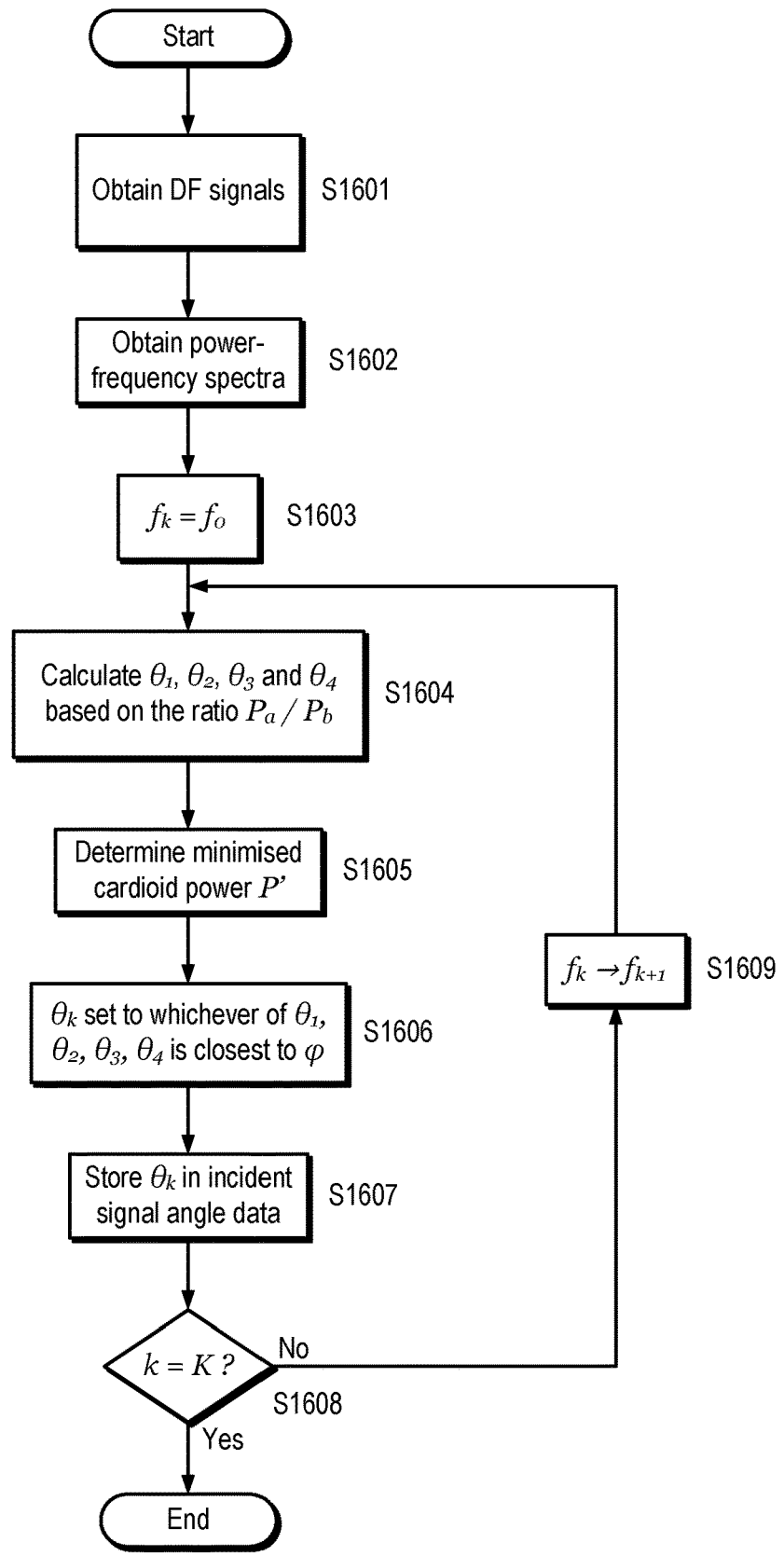
FIG. 16 is a process flow diagram for a fourth method of direction finding using measured values of signal powers.

Referring to FIG. 16, the DF signal obtaining module 12, 12b generates DF signals 11 for each of the cardioid DF signals $\Phi_N$, $\Phi_S$, $\Phi_E$, $\Phi_W$, $\Phi_{NE}$, $\Phi_{SW}$, $\Phi_{NW}$, $\Phi_{SE}$ and for at least one pair of figure-of-eight DF signals $\psi_a$, $\psi_b$ (step S1601). The pair of figure-of-eight signals $\psi_a$, $\psi_b$ may be either a first pair of $\psi_{NS}$ and $\psi_{EW}$, or a second pair of $\psi_{NESW}$ and $\psi_{NWSE}$.

The corresponding DF spectra 16 are generated by the spectrum obtaining module 13, and the incident angle determining module 14 subsequently calculates the respective power values based on frequency-wise multiplication of each DF spectrum 16 by its complex conjugate (step S1602). The subsequent processes are carried out for each given frequency $f_k$, starting with the lowest frequency $f_1$ which is included in the bandwidth corresponding to the plurality of DF spectra 16 (step S1603).

In this example, the incident angle determining module 14 calculates possible incident signal angles $\theta_k$ for the given frequency $f_k$ based on the arctangent of the ratio of the measured power values $P_a$, $P_b$ derived from the pair of figure-of-eight signals $\psi_a$, $\psi_b$ (step S1604). For example, in the case that $P_a = P_{NS}$ and $P_b = P_{EW}$, up to four possible incident signal angles $\theta_k$ may be calculated according to:

$$\theta_k^{(1)} = \arctan\left(+\sqrt{\frac{P_{NS}(f_k)}{P_{EW}(f_k)}}\right) \tag{17.1}$$

$$\theta_k^{(2)} = -\theta_k^{(1)} \tag{17.2}$$

$$\theta_k^{(3)} = \pi - \theta_k^{(1)} \tag{17.3}$$

$$\theta_k^{(4)} = \theta_k^{(1)} - \pi \tag{17.4}$$

In which the four possible incident signal angles are denoted $\theta^{(1)}$, $\theta^{(2)}$, $\theta^{(3)}$ and $\theta^{(4)}$ (omitting the k frequency subscript for clarity) and in which, as in FIGS. 1a and 1b, the incident angles are taken with respect to the direction of the East antenna 9. It should be noted that when the second pair of figure-of-eight DF signals are used instead, i.e. when $P_a = P_{NESW}$ and $P_b = P_{NWSE}$, then Equations 17 are shifted by $\pi/4$ radians (i.e. 45 degrees) if the same reference direction is used.

The incident angle determining module 14 selects a minimised cardioid signal power value $P'(f_k)$, which corresponds to the lowest measured power value of the cardioid signal powers $P_N(f_k)$, $P_E(f_k)$, $P_S(f_k)$, $P_W(f_k)$, $P_{NE}(f_k)$, $P_{SW}(f_k)$, $P_{NW}(f_k)$ and $P_{SE}(f_k)$ (step S1605). The minimised cardioid power value $P'(f_k)$ corresponds to an approximate incident signal direction $\varphi$, which is the null direction of the minimised cardioid $P'(f_k)$.

For example, if the minimised cardioid signal power value at given frequency $f_k$ was $P_N(f_k)$, i.e. the cardioid lobe is in the direction of the North antenna 9, then the approximate incident signal direction $\varphi$ would be in the direction of the corresponding null direction, i.e. in the direction of the South antenna.

Alternatively, the four possible signal angles $\theta^{(1)}$ through $\theta^{(4)}$ for each frequency $f_k$ need not be calculated based on the arctangent of the square root of the power ratio $P_{NS}/P_{EW}$, as Equations 17.1 through 17.4. Instead, the four possible signal angles $\theta^{(1)}$ through $\theta^{(4)}$ may be calculated based on a generalised monotonically increasing function, H, of the power ratio $P_a/P_b$:

$$\theta_k^{(1)} = H\left(\frac{P_a(f_k)}{P_b(f_k)}\right) \tag{18}$$

In which H is any monotonically increasing function, $P_a$ is a first measured value of signal power and $P_b$ is a second measured value of signal power. The angles $\theta^{(2)}$ through $\theta^{(4)}$ are calculated from 601) as in Equations 17.2 through 17.4. The measured values of signal power used for the first and second values, $P_a$, $P_b$, may in general be selected from the group comprising $P_{NS}$, $P_{EW}$, $P_{NESW}$ and $P_{NWSE}$. For example, the monotonically increasing function H may be a power law:

$$H\left(\frac{P_a(f_k)}{P_b(f_k)}\right) = \left(\frac{P_a(f_k)}{P_b(f_k)}\right)^\alpha \tag{19}$$

In which $\alpha$ is a positive real number. In general, the function H may be any monotonically increasing function, and may be determined from theory or on the basis of calibration measurements.

The possible signal angles $\theta^{(1)}$ through $\theta^{(4)}$ are compared to the approximate incident signal angle $\varphi$, and the possible signal angle $\theta^{(1)}$ through $\theta^{(4)}$ which has the smallest deviation from the approximate signal angle $\varphi$ is selected as the incident signal angle $\theta_k$ at the given frequency $f_k$ (step S1606). The incident signal angle $\theta_k$ is included in the incident signal angle data 17. The incident signal angle data 17 may also include a quality measure which is the ratio or difference of the minimum cardioid signal power $P'(f_k)$ and the measured signal power of the cardioid signal opposite to the minimised cardioid signal. For example, if the minimised cardioid signal power was $P_N(f_k)$, then the quality measure might be the ratio $P_S(f_k)/P_N(f_k)$. The incident angle determining module 14 refers the initially calculated incident signal angle $\theta_k$ to a calibration look-up table (not shown) stored in the antenna array information storage 15. The entry in the calibration look-up table corresponding to the initially calculated incident signal angle $\theta_k$ stores a correction factor determined during calibration of the DF system 4, which is applied to the initially calculated incident signal angle $\theta_k$ to remove systematic biases. The incident signal angle $\theta_k$ for the given frequency $f_k$ is stored to the incident signal angle data 17 (step 1607).

The incident signal determining module 14 checks whether an incident signal angle $\theta_k$ has been assigned for every given frequency $f_k$ included in the bandwidth of the DF spectra 16, i.e. whether k=K (step S1608). If an incident signal angle $\theta_k$ has been assigned for every given frequency $f_k$, the method is finished. If there are further given frequencies $f_k$ which have not yet been assigned an incident signal angle $\theta_k$, the next given frequency, $f_{k+1}$, is selected (step S1609) and the incident signal determining module 14 calculates the possible incident signal angles $\theta^{(1)}$ through $\theta^{(4)}$ for the next given frequency $f_{k+1}$ (step S1604).

The calculation of the incident signal angles $\theta_k$ using the fourth method may use both the first pair of figure-of-eight DF signals $\psi_{NS}$ and $\psi_{EW}$ and the second pair of figure-of-eight DF signals $\psi_{NESW}$ and $\psi_{NWSE}$, instead of one or the other. In this case, the incident signal angle $\theta_k$ can be calculated as an average or other linear combination of the values obtained using the first pair $\psi_{NS}$, $\psi_{EW}$ and the second pair of figure-of-eight DF signals $\psi_{NESW}$, $\psi_{NWSE}$.

Machine Learning Methods

The hereinbefore described methods of estimating incident signal angles may be modified to incorporate machine learning methods. For example, machine learning methods may be employed to optimise, during calibration and/or during operation, corrections to compensate for bias errors which may arise in any of the hereinbefore described methods. For example, in the case of the first method, machine learning methods may be employed to optimise, during calibration and/or during operation, the parameters of the generalised monotonically increasing vector weighting function F in Equation 14. For example, in the second method, machine learning methods could be employed to optimise, during calibration and/or during operation, the corrections needed to compensate for bias errors in the case that the second method is used with directional antennae 24 which have non-Gaussian antenna gain patterns 22. For example, in the fourth method, machine learning methods may be employed to optimise, during calibration and/or during operation, the parameters of the generalised monotonically increasing function H in Equation 18.

Fifth Method of Calculating Incident Signal Angles

Alternatively, the incident signal angles $\theta_k$ at each given frequency $f_k$ may be directly calculated using a multi-layer perceptron, or other suitable neural network, provided by the incident angle determining module 14. In this case, the inputs would be the measured values of signal power $P_n(f_k)$, in which $1 \leq n \leq N$, and the network would be trained, during calibration of the system using known RF signal sources 5, using back-propagation of weight values or another suitable training method.

Multi-Path and Signal Channel Estimation

The methods described hereinbefore can yield values of signal power and incident signal angle $\theta_k$ at each given frequency $f_k$ included in the bandwidth $\Delta f$ of the generated DF spectra 16. These measurements may be repeated over time to provide a time sequence. This may provide additional information. For example, the incident signal angle $\theta_k$ at some frequencies $f_k$ may include extra directions corresponding to scattering from objects 'behind' the receiver. This might represent a detection of multi-path propagation of an RF signal 2. Such detection can assist in attaching a quality measure to the bearing estimates obtained from the first type of DF system 4a. Additionally or alternatively, the measured signal power and/or incident signal angle $\theta_k$ may vary over time for some given frequencies $f_k$, but not for others. This may indicate fading, e.g. due to ground-bounce multi-path.

Multi-path and time-varying methods may be used to provide additional information on the transmission channel, and can assist in attaching measures of quality to the incident signal angles $\theta_k$ calculated by the incident signal angle determining module 14.

DF System Calibration Methods

Whilst antenna gain patterns 22 can be readily obtained through theoretical calculations of antenna responses, it may be preferred to carry out experimental calibrations of the antenna array 8 of a DF system 4, in particular to measure the antenna gain patterns 22 at each given frequency $f_k$. Such information can then be stored in the antenna array information storage 15 and used in the hereinbefore described methods for direction finding using measured values of signal powers.

In particular, calibration on-site (i.e. at the site where the antenna array 8 is to be deployed) can take account of the actual installation environment such as, for example, DF antenna height, the nature of the ground, proximity of obstacles which may result in multi-path propagation, ambient sources of RF signals and any systematic variations due to the typical distances, bearings or heights of signal sources 5. Calibration information may also help in assigning quality measures to estimated incident signal angles $\theta_k$ subsequently calculated in use. A convenient method is to move a known signal source 5 around the area of interest, and to make measurements using the DF system 4 when the known signal source 5 is at known locations, so that the corresponding incident signal angle $\theta_k$ is known. Performing the calculation of incident signal angles $\theta_k$ according to one of the hereinbefore described methods can enable the calibration of the DF system 4 to be checked and, if required, corrected.

One method of doing this is to use a wide band signal source 5, and to sweep the receiver of the DF system 4 through the desired frequency range to obtain measurements spanning all frequencies $f_k$ of interest. However, using a wideband signal source 5 may not be convenient or permitted in some operating environments, for example, because of regulatory requirements/restrictions.

An alternative calibration method uses a signal source 5 which is synchronised to the receiver, for example, using GPS signals. The transmitter may transmit an RF signal 2 which sweeps in frequency, while the receiver of the DF system 4 performs a corresponding frequency sweep. This can enable a lower power output level to be used by the signal source 5. The moving signal source 5 may be tracked, for example using GPS, and the location data sent back to the DF system 4 for testing the calibration.

One particularly useful method for calibrating a DF system 4 utilises a signal source 5 placed on an airborne platform, for example, a remotely controlled 'quad-copter' or a miniature helicopter. The track of the airborne platform may be either pre-programmed, or recorded as-it-happens. This can enable calibration of a DF system 4 to be performed quickly and cost-effectively.

Modifications

It will be apparent the many modifications may be made to the embodiment hereinbefore described.

For example, the second type of DF system 4b has been described including north N, south S, east E and west W antennae. However, a DF system 4 using hybrid antenna array elements 10b may use more than two pairs of antennae and can be operated in an essentially similar fashion.

Figure 17:
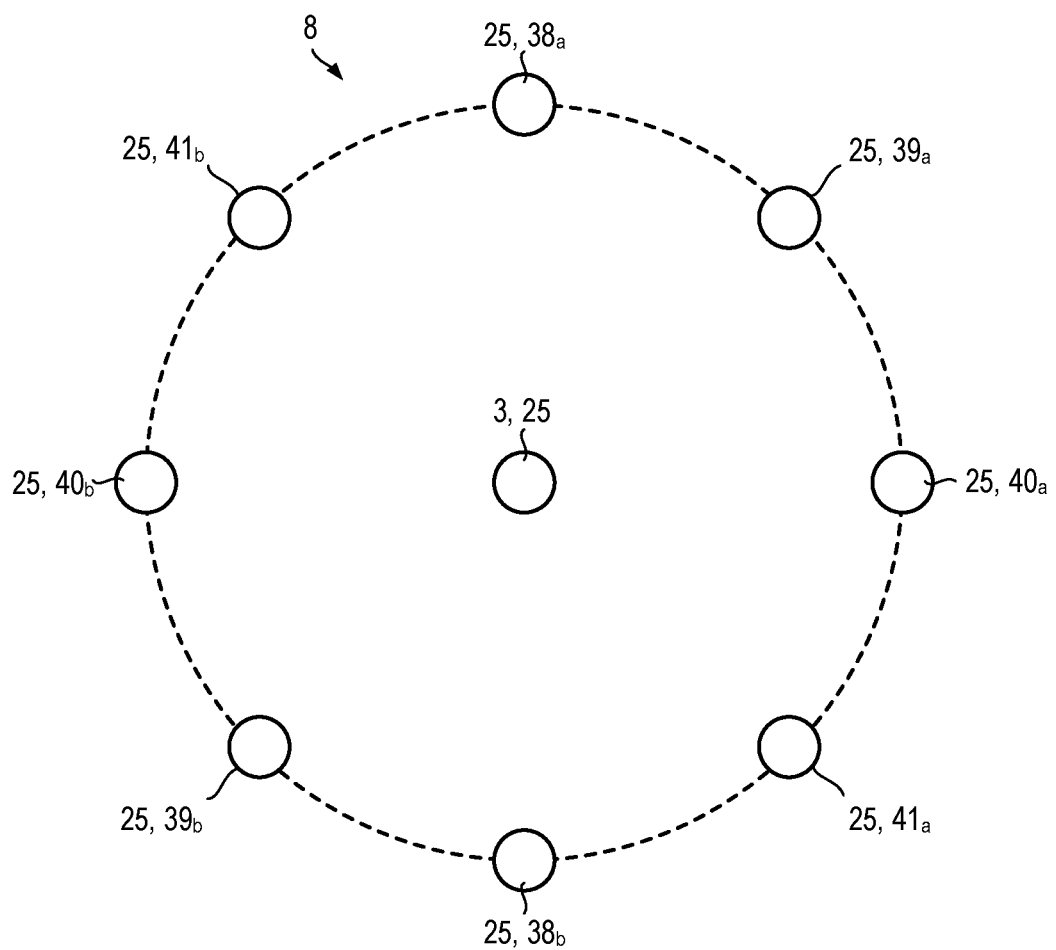
FIG. 17 is a schematic plan view of another example of the second type of DF system.

Referring to FIG. 17, another example is shown of an antenna array 8 which can be used with the second type of DF system using hybrid antenna array elements 10b.

Referring to FIG. 17, a schematic plan view of an antenna array 8 comprising four pairs of opposed antennae, each of which is a vertically orientated dipole antenna 25, including a first pair of antennae $38_a$, $38_b$, a second pair of antennae $39_a$, $39_b$, a third pair of antennae $40_a$, $40_b$ and a fourth pair of antennae $41_a$, $41_b$. A central sense antenna 3 which is a vertically orientated dipole antenna 25 is also included. In the example shown, the pairs of opposed antennae are positioned around the perimeter of a circle centred on the sense antenna 3. Taking the difference of antenna signals 7 from any pair of opposed antennae, for example the first pair $38_a$, $38_b$, will produce a figure-of-eight DF signal 11 which corresponds to a hybrid antenna array element 10*b* having a figure-of-eight shaped antenna gain pattern 22, in an way analogous to that described hereinbefore in relation to the second type of DF system 4*b*. In a similar way, further combination of the difference signal from a pair of opposed antennae can produce cardioid DF signals in a manner analogous to that hereinbefore described.

Although FIGS. 8*a* and 8*b* show an antenna array 8 including two pairs of opposed antennae, and FIG. 17 shows an antenna array including four pairs of opposed antennae, in principle, any number of pairs of opposed antennae may be used in an analogous manner to provide hybrid antenna array elements 10*b*.

The invention claimed is:

1. A method of determining incident angles of RF signals received by an antenna array comprising a plurality of antennae, the method comprising:
   generating a plurality of direction finding (DF) signals based on antenna signals received from the antenna array, wherein each DF signal corresponds to a respective antenna array element corresponding to one or more antennae;
   generating a plurality of DF spectra, each DF spectrum generated by converting a corresponding DF signal into a power spectrum, wherein each DF spectrum comprises measured values of signal power at two or more given respective frequencies; and
   calculating an incident signal angle for each given frequency based on the measured values of signal power at the frequency, the configuration of the antennae in the antenna array and antenna gain patterns corresponding to the antenna array elements.

2. A method according to claim 1, wherein each antenna array element has a directionally dependent antenna gain pattern, such that each DF signal has a corresponding direction vector determined based on the respective antenna gain pattern, wherein calculating an incident signal angle for each given frequency comprises:
   selecting a set of at least two DF spectra from the plurality of DF spectra;
   calculating a resultant vector as a weighted sum of the direction vectors corresponding to each of the set of at least two selected DF spectra, wherein the direction vectors are weighted by a monotonically increasing function of the respective measured values of signal power at the given frequency; and
   determining the incident signal angle for the frequency based on the resultant vector.

3. A method according to claim 1, wherein each antenna array element has a directionally dependent antenna gain pattern, such that each DF signal has a corresponding direction vector determined based on the respective antenna gain pattern, wherein calculating an incident signal angle for each given frequency comprises:
   selecting first and second DF spectra based on the two largest power values at the frequency;
   calculating the ratio of the first and second DF spectra power values at the frequency; and
   determining the incident signal angle for the frequency relative to the midpoint of the respective direction vectors of the first and second DF spectra, based on the product of the ratio expressed in decibels and a direction finding slope.

4. A method according to claim 1, wherein each antenna array element has a directionally dependent antenna gain pattern, wherein generating a plurality of DF signals comprises:
   selecting a set of DF signals such that the respective set of directionally dependent antenna gain patterns has a distinct combination of gain values for any incident signal angle;
   generating the selected set of DF signals;
   wherein calculating an incident signal angle for each given frequency comprises:
   defining a fit parameter as the sum over a set of estimators, each estimator corresponding to a respective DF spectrum and calculated by squaring the difference of the respective measured value of signal and an estimated signal power value calculated based on an assumed incident signal angle, an assumed signal power and the respective directionally dependent antenna gain pattern; and determining the incident signal angle for the frequency based on the values of the assumed incident signal angle and the assumed signal power which minimise the value of the fit parameter.

5. A method according to claim 1, comprising successively obtaining the DF signals.

6. A method according to claim 1, comprising simultaneously obtaining the DF signals.

7. A method according to claim 1, wherein each antenna array element is a hybrid antenna array element corresponding to a subset of one or more physical antennae in the antenna array, such that the DF signal corresponding to the hybrid antenna array element is based on a linear combination of the antenna signals received from the respective one or more physical antennae.

8. A method according to claim 7, wherein the antenna array includes first, second, third, fourth and fifth antennae, wherein each DF signal is based on a respective antenna array element which corresponds to a linear combination of one or more antenna signals selected from a first antenna signal $\psi_1$, a second antenna signal $\psi_2$, a third antenna signal $\psi_3$, a fourth antenna signal $\psi_4$, and a fifth antenna signal $\psi_5$;
   wherein the first, second, third and fourth antennae are arranged in a rectangular cruciform configuration and are equidistant a given distance from the fifth antenna, and wherein the fifth antenna lies between the first and second antennae and between the third and fourth antennae; or
   wherein the fifth antenna signal $\psi_5$ is calculated as the sum of the first, second, third and fourth antenna signals, and wherein the first, second, third and fourth antennae are arranged in a rectangular cruciform configuration and are equidistant a given distance from a central point, and wherein the central point lies between the first and second antennae and between the third and fourth antennae.

9. A method according to claim 8 wherein generating a plurality of DF signals comprises:
   selecting a first DF signal based on a first antenna signal combination selected from a signal combination group comprising $\psi_1-\psi_2$, $\psi_3-\psi_4$, $\psi_1+\psi_3-\psi_2-\psi_4$ and $\psi_1+\psi_4-\psi_2-\psi_3$;
   selecting second and third DF signals based on adding or subtracting the product $i\beta \times \psi_5$ from second and third antenna signal combinations selected from the signal combination group, wherein the second antenna signal combination is different to the first, the third is different to the second and $\beta$ is an amplitude adjustment factor;
   selecting a fourth DF signal based on the fifth antenna signal $\psi_5$;
   generating the selected set of DF signals;
   wherein calculating an incident signal angle for each given frequency comprises:

defining a fit parameter as the sum over a set of estimators, each estimator corresponding to a respective DF spectrum and calculated by squaring the difference of the respective measured value of signal and an estimated signal power value calculated based on an assumed incident signal angle, an assumed signal power and the respective directionally dependent antenna gain pattern; and determining the incident signal angle for the frequency based on the values of the assumed incident signal angle and the assumed signal power which minimise the value of the fit parameter.

10. A method according to claim 8, wherein generating a plurality of DF signals comprises:

generating first and second DF signals based on a first pair of antenna signal combinations $\psi_1-\psi_2$ and $\psi_3-\psi_4$, or a second pair of antenna signal combinations $\psi_1+\psi_3-\psi_2-\psi_4$ and $\psi_1+\psi_4-\psi_2-\psi_3$;

generating eight cardioid DF signals based on the antenna signal combinations $\psi_1-\psi_2\pm i\beta\times\psi_5$, $\psi_3-\psi_4\pm i\beta\times\psi_5$, $\psi_1+\psi_3-\psi_2-\psi_4\pm i\beta\times\psi_5$ and $\psi_1+\psi_4-\psi_2-\psi_3\pm i\beta\times\psi_5$, wherein $\beta$ is an amplitude adjustment factor chosen such that the antenna gain pattern corresponding to each cardioid DF signal has a corresponding null direction;

wherein calculating an incident signal angle comprises, for each given frequency:

calculating up to four estimated signal angles, each estimated signal angle based on a monotonically increasing function of the ratio of the measured values of signal power of the first and second DF spectra; and determining the incident signal angle for the frequency based on the estimated signal angle which is closest to the null direction of the cardioid DF signal which has the lowest measured value of signal power for the frequency.

11. A method according to claim 10 further comprising:

generating third and fourth DF signals based on the pair of antenna signal combinations not selected for the first and second DF signals;

calculating up to four further estimated signal angles, each further estimated signal angle based on a monotonically increasing function H of the ratio of the measured values of signal power of the third and fourth DF spectra;

calculating the incident signal angle for the frequency as an average of the estimated signal angle and the further estimated signal angle which are closest to the null direction of the cardioid DF signal which has the lowest measured power for the frequency.

12. A method according to claim 1, wherein the incident signal angle for each given frequency is determined using a neural network which receives the measured values of power at the frequency as input.

13. Apparatus for determining incident angles of RF signals received by an antenna array comprising a plurality of antennae, the apparatus comprising:

a direction finding (DF) signal module configured to generate a plurality of DF signals based on antenna signals received from the antenna array, wherein the DF signal module is configured such that each DF signal corresponds to a respective antenna array element and each antenna array element corresponds to one or more antennae;

a spectrum obtaining module configured to receive the plurality of DF signals and to generate a corresponding plurality of DF spectra, each DF spectrum generated by converting a corresponding DF signal into a power spectrum, wherein each DF spectrum comprises measured values of power at two or more given respective frequencies;

an antenna array information store configured to hold information about the configuration of the antennae in the antenna array and the antenna gain patterns corresponding to the antenna array elements;

an incident angle determining module configured to calculate an incident signal angle for each frequency based on the measured values of signal power at the frequency and the configuration of the antennae in the antenna array and the antenna gain patterns corresponding to the antenna array elements.

14. Apparatus according to claim 13, wherein each antenna array element has a directionally dependent antenna gain pattern and the antenna array information store is configured to hold a direction vector corresponding to each DF signal and determined based on the respective antenna gain pattern, and wherein the incident signal angle determining module is configured to, for each given frequency:

select a set of at least two DF spectra from the plurality of DF spectra;

calculate a resultant vector as a weighted sum of the direction vectors corresponding to each of the set of at least two selected DF spectra, wherein the direction vectors are weighted by the respective measured values of signal power at the given frequency; and determine the incident signal angle for the frequency based on the resultant vector.

15. Apparatus according to claim 13, wherein each antenna array element has a directionally dependent antenna gain pattern and the antenna array information store is configured to hold a direction vector corresponding to each DF signal and determined based on the respective antenna gain pattern, and wherein the incident signal angle determining module is configured to, for each given frequency:

select first and second DF spectra based on the two largest power values at the frequency;

calculate the ratio of the first and second DF spectra power values at the frequency; and determine the incident signal angle for the frequency relative to the midpoint of the respective direction vectors of the first and second DF spectra, based on the product of the ratio expressed in decibels and a direction finding slope.

16. Apparatus according to claim 13, wherein the antenna array information storage holds antenna gain patterns which are directionally dependent, and wherein the incident signal angle determining module is configured to, for each given frequency:

select a set of DF signals such that the respective set of directionally dependent antenna gain patterns has a distinct combination of gain values for any incident signal angle;

generate the selected set of DF signals;

wherein the incident signal angle determining module is configured to, for each given frequency:

define a fit parameter as the sum over a set of estimators, each estimator corresponding to a respective DF spectrum and calculated by squaring the difference of the respective measured value of signal and an estimated signal power value calculated based on an assumed incident signal angle, an assumed signal power and the respective directionally dependent antenna gain pattern; and determine the incident signal angle for the frequency based on the values of the assumed incident signal angle and the assumed signal power which minimise the value of the fit parameter.

17. Apparatus according to claim 13, wherein each antenna array element is a hybrid antenna array element corresponding to a subset of one or more physical antennae in the antenna array, and wherein the DF signal obtaining module is configured to generate the DF signal corresponding to each hybrid antenna array element based on a linear combination of the antenna signals received from the respective one or more physical antennae.

18. Apparatus according to claim 13, wherein the antenna array includes first, second, third, fourth and fifth physical antennae, and wherein the DF signal obtaining module is configured to generate each DF signal based on a distinct linear combination of one or more antenna signals selected from a first antenna signal $\psi_1$, a second antenna signal $\psi_2$, a third antenna signal $\psi_3$, a fourth antenna signal $\psi_4$, and a fifth antenna signal $\psi_5$, and wherein the first, second, third and fourth antennae are arranged in a rectangular cruciform configuration and are equidistant a given distance from the fifth antenna and wherein the fifth antenna lies between the first and second antennae and between the third and fourth antennae; or wherein the antenna array includes first, second, third and fourth physical antennae, and wherein the DF signal obtaining module is configured to generate each DF signal based on a distinct linear combination of one or more antenna signals selected from a first antenna signal $\psi 1$, a second antenna signal $\psi 2$, a third antenna signal $\psi 3$, a fourth antenna signal $\psi 4$, and a fifth antenna signal $\psi 5$ which is calculated as the sum of the first, second, third and fourth antenna signals, and wherein the first, second, third and fourth antennae are arranged in a rectangular cruciform configuration and are equidistant a given distance from a central point and wherein the central point lies between the first and second antennae and between the third and fourth antennae.

19. Apparatus according to claim 18, wherein the DF signal obtaining module is configured to:

generate first and second DF signals based on a first pair of antenna signal combinations $\psi_1-\psi_2$ and $\psi_3-\psi_4$, or a second pair of antenna signal combinations $\psi_1+\psi_3-\psi_2-\psi_4$ and $\psi_1+\psi_4-\psi_2-\psi_3$; generate eight cardioid DF signals based on the antenna signal combinations $\psi_1-\psi_2\pm i\beta\times\psi_5$, $\psi_3-\psi_4\pm i\beta\times\psi_5$, $\psi_1+\psi_3-\psi_2-\psi_4\pm i\beta\times\psi_5$ and $\psi_1+\psi_4-\psi_2-\psi_3\pm i\beta\times\psi_5$, wherein $\beta$ is an amplitude adjustment factor chosen such that the antenna gain pattern corresponding to each cardioid DF signal has a corresponding null direction;

wherein the incident signal angle determining module is configured to, for each given frequency:

calculate up to four estimated signal angles, each estimated signal angle based on a monotonically increasing function of the ratio of the measured values of signal power of the first and second DF spectra; and determine the incident signal angle for the frequency based on the estimated signal angle which is closest to the null direction of the cardioid DF signal which has the lowest measured value of signal power for the frequency.

20. A system comprising:

apparatus according to claim 13; and an antenna array including:

at least three antenna array elements, each antenna array element having a directionally dependent antenna gain pattern; or first, second, third, fourth and fifth physical antennae, wherein the first, second, third and fourth antennae are arranged in a rectangular cruciform configuration and are equidistant a given distance from the fifth antenna and wherein the fifth antenna lies between the first and second antennae and between the third and fourth antennae.

* * * * *